Feb. 23, 1932.  R. S. KIRK  1,846,260
CHAFING STRIP BUILDING MACHINE
Filed Sept. 16, 1926   12 Sheets-Sheet 6
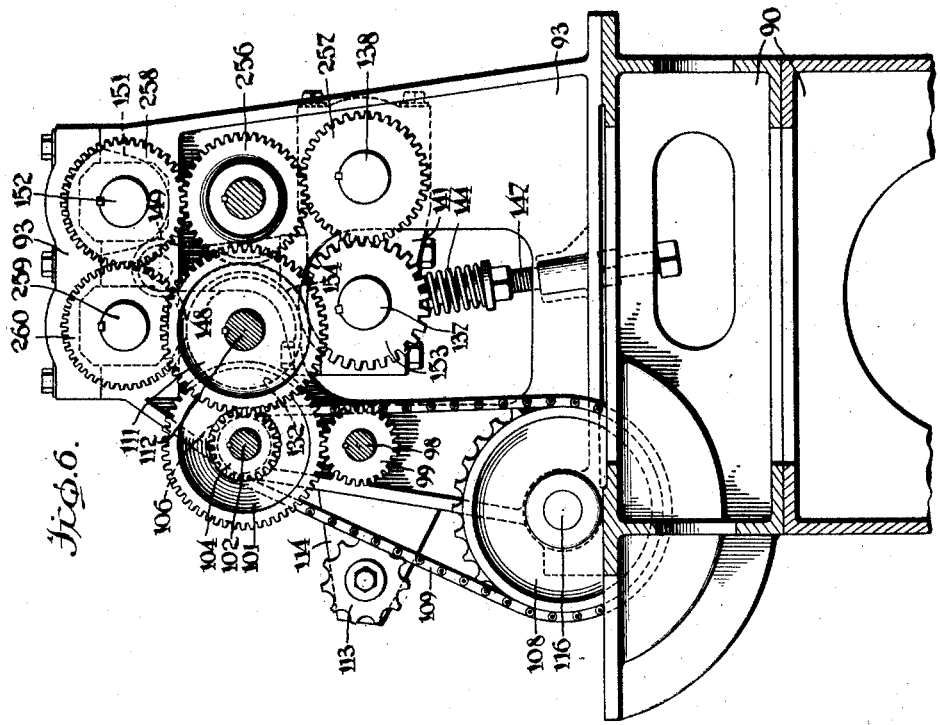
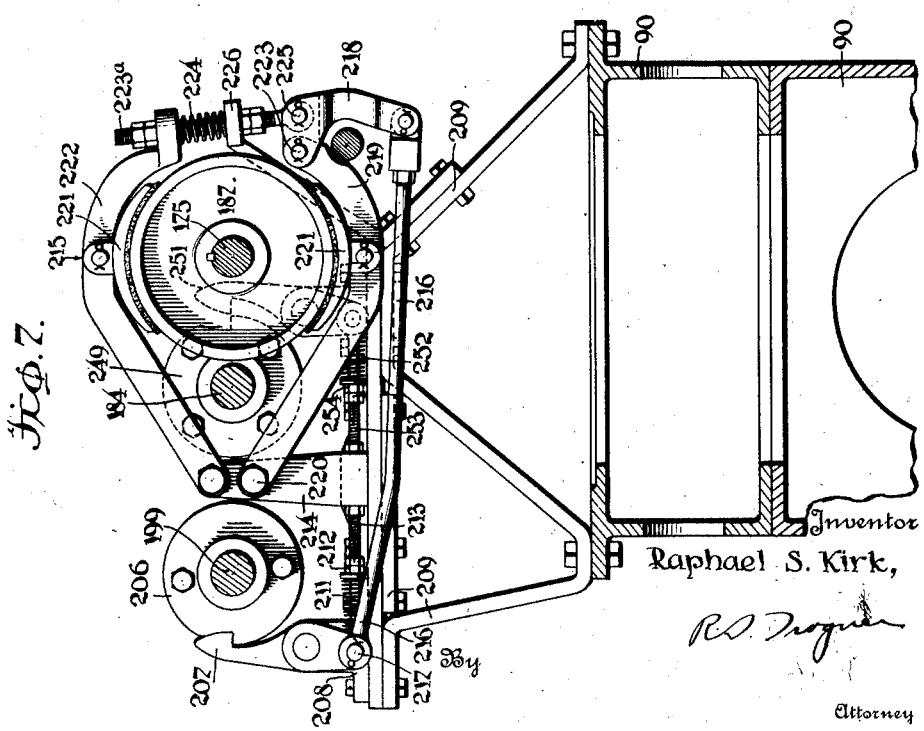
Inventor
Raphael S. Kirk,
Attorney

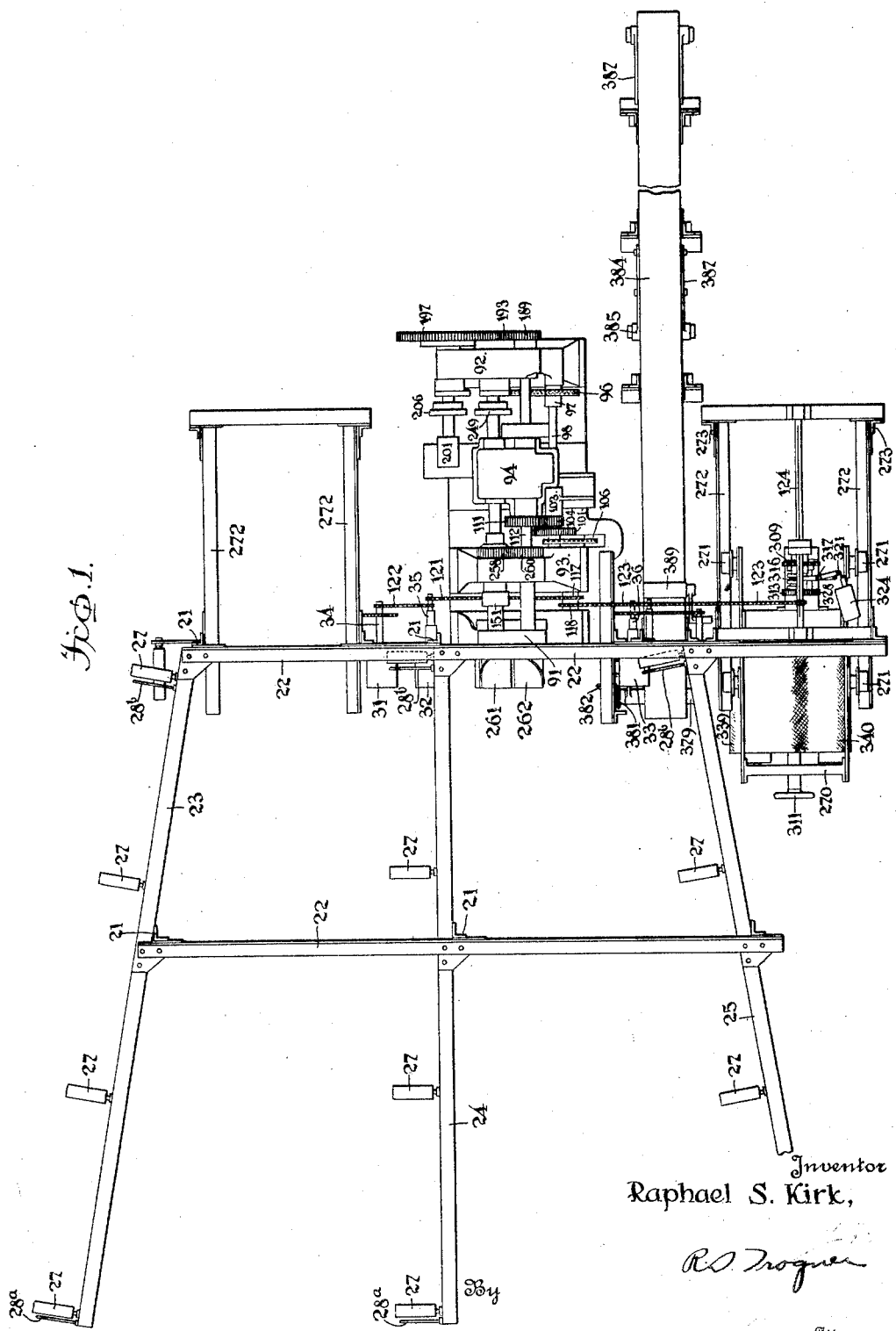

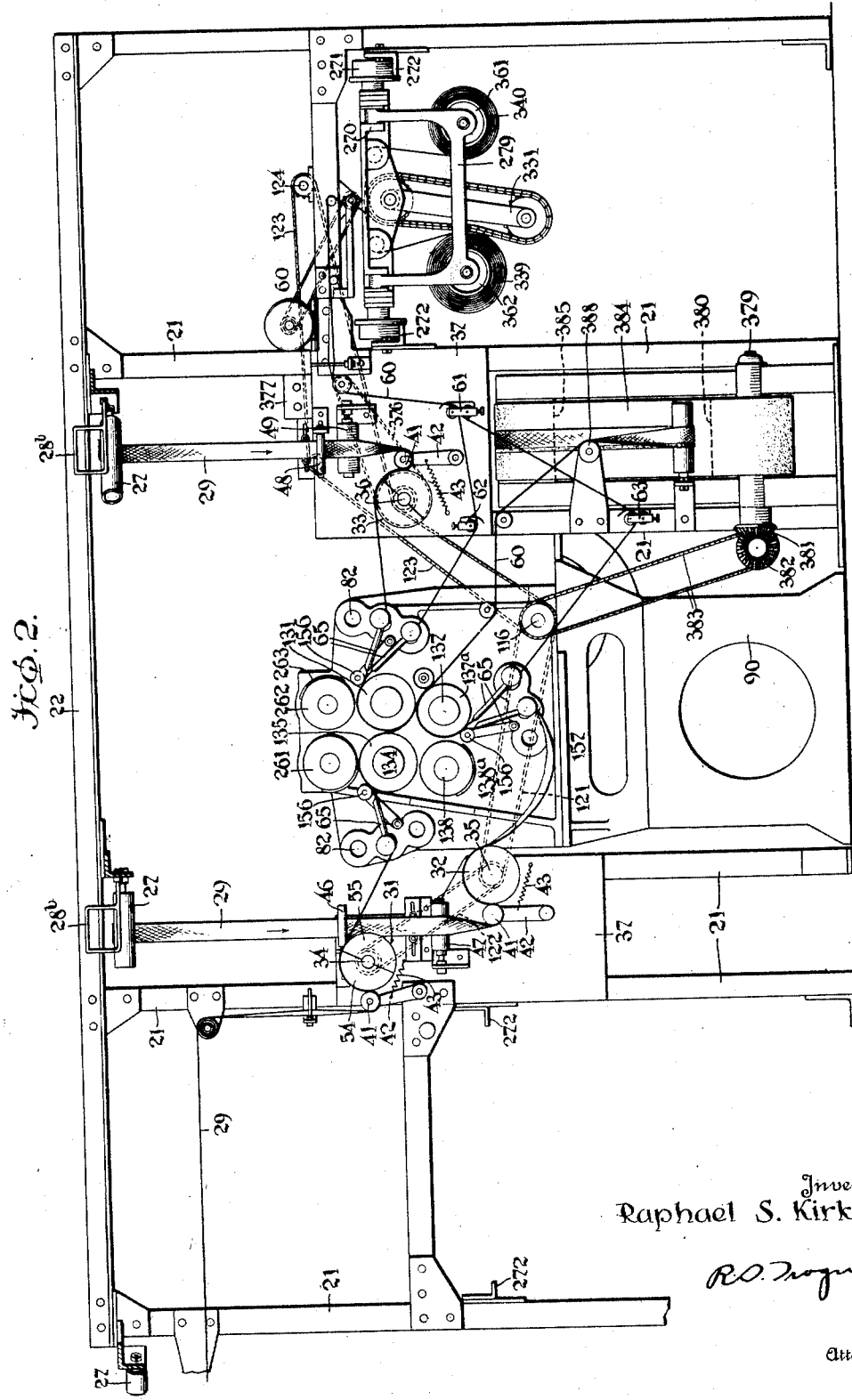

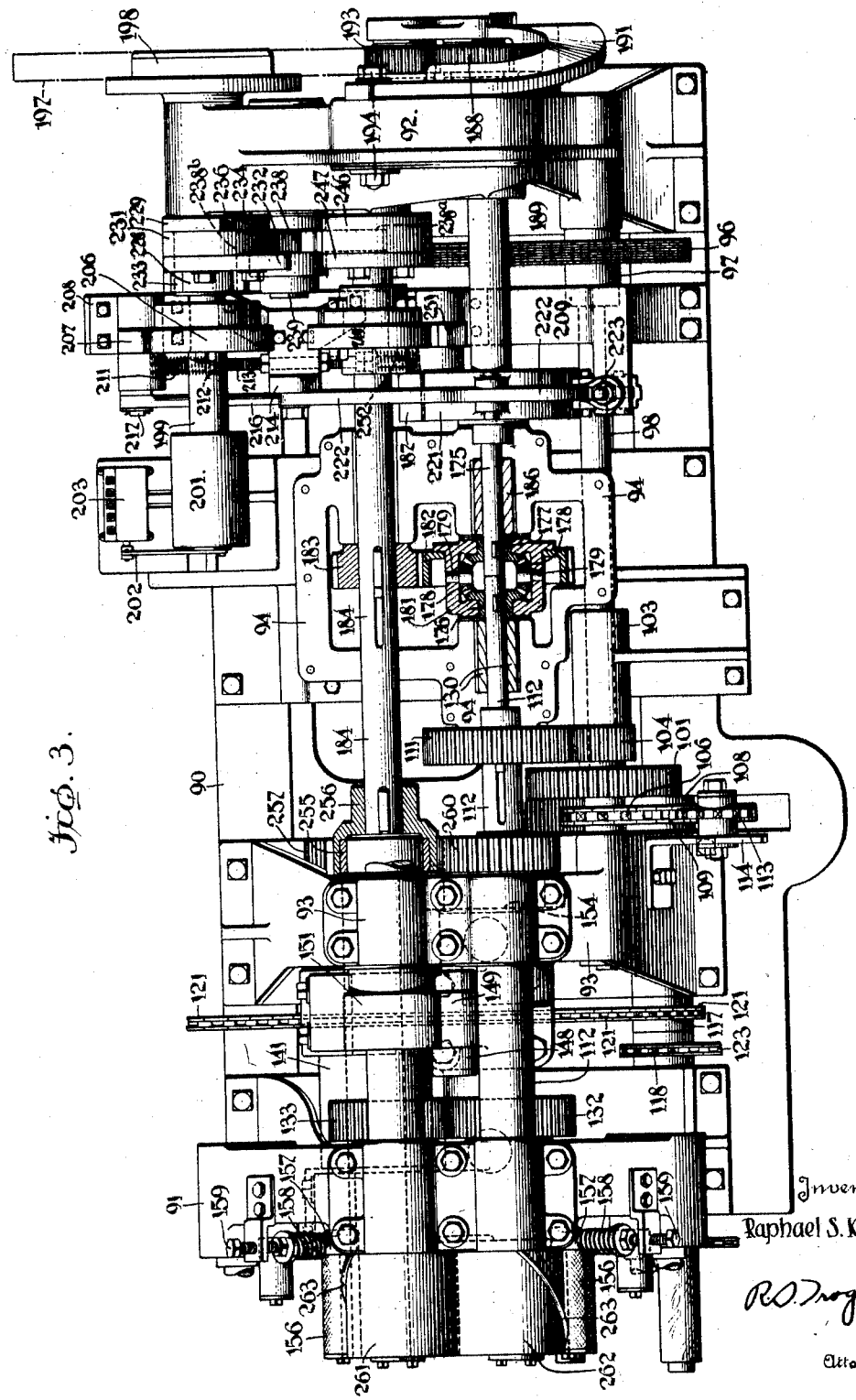

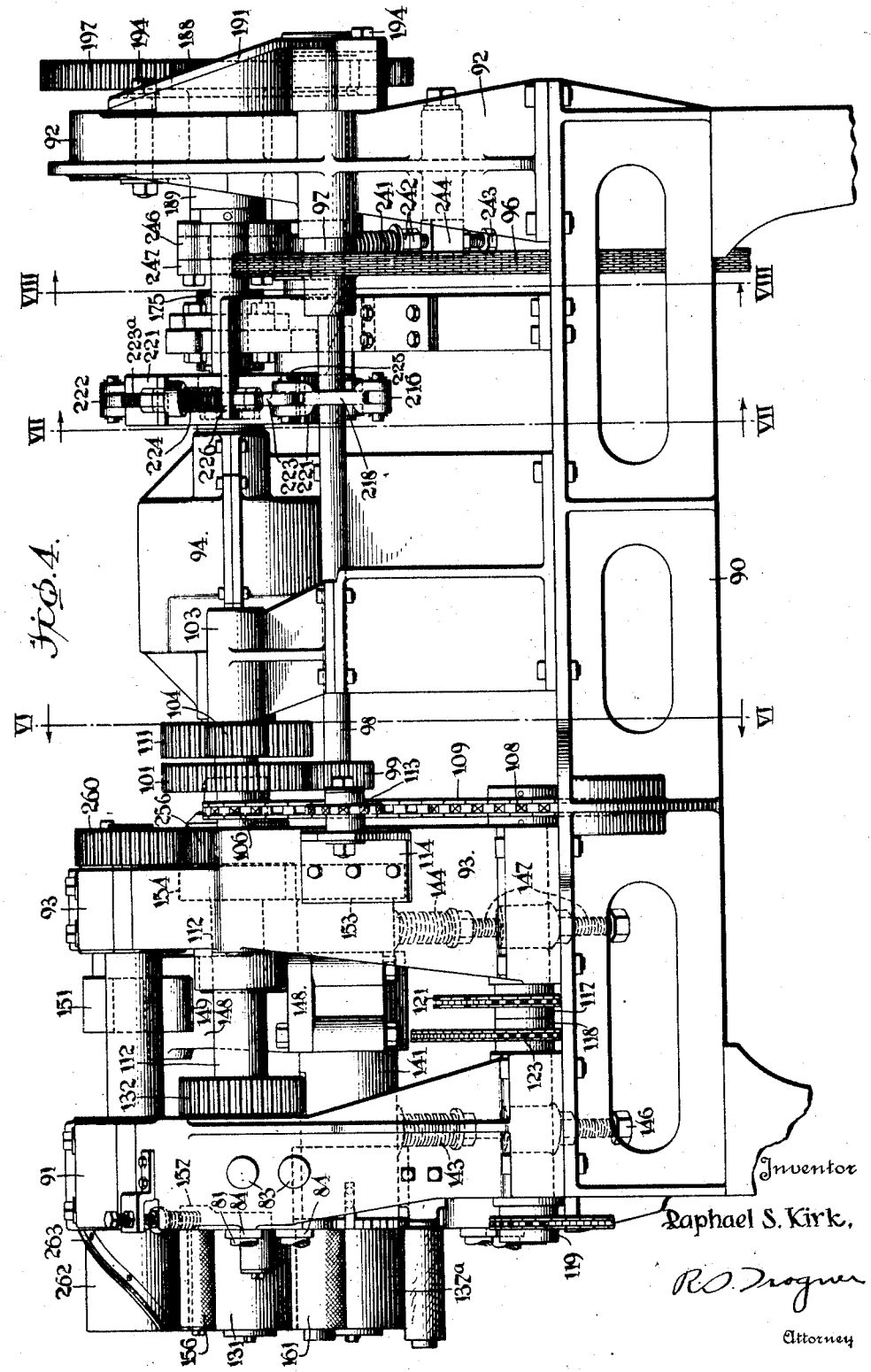

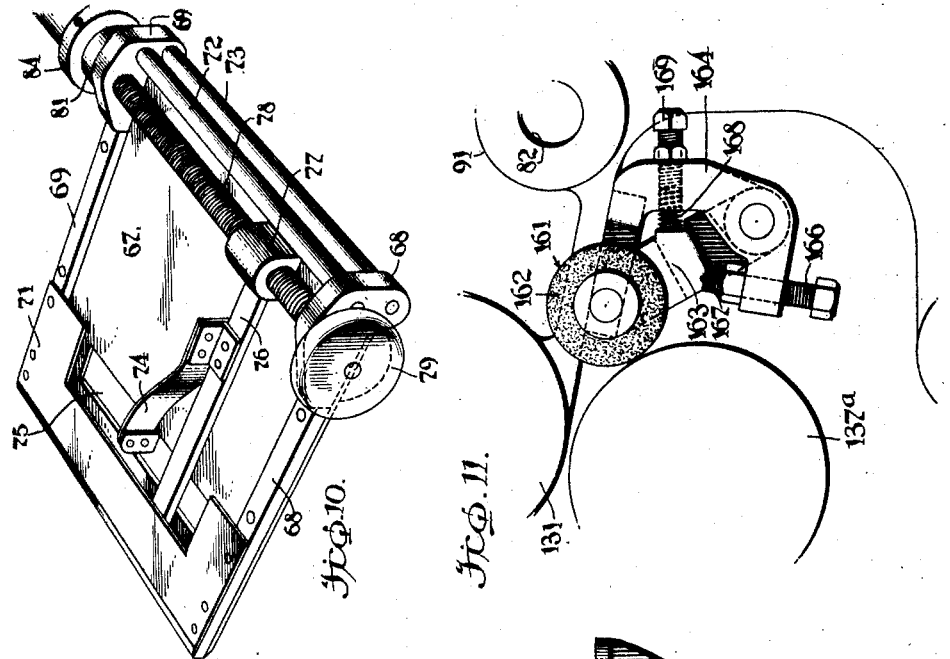
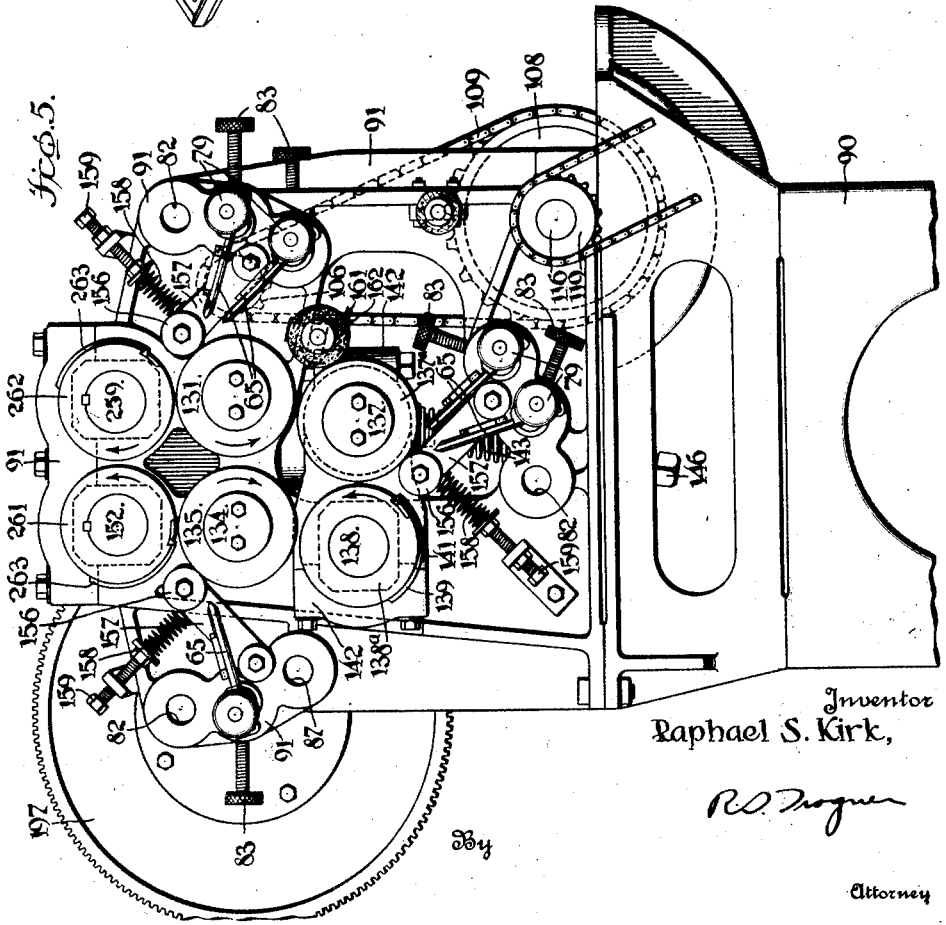

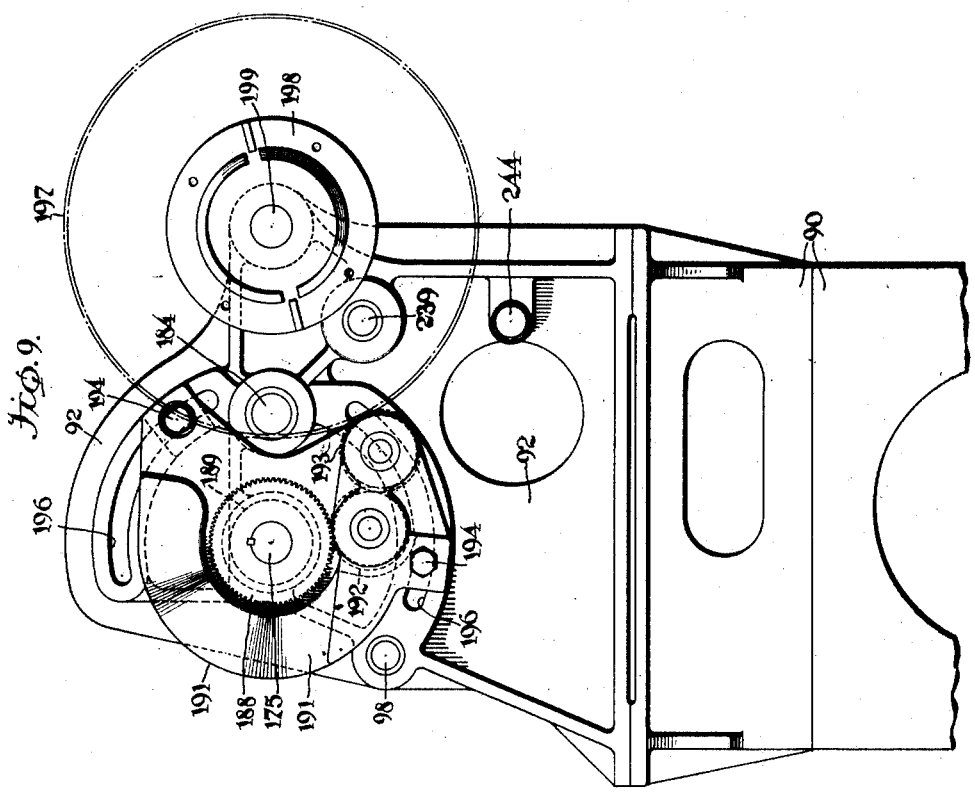
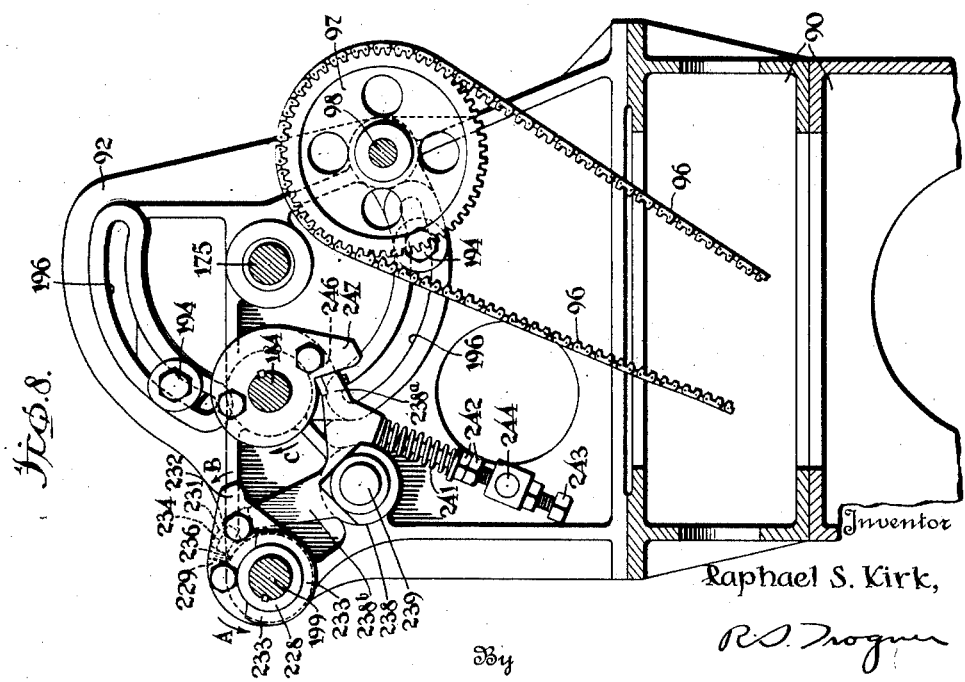

Feb. 23, 1932.    R. S. KIRK    1,846,260
CHAFING STRIP BUILDING MACHINE
Filed Sept. 16, 1926    12 Sheets-Sheet 8
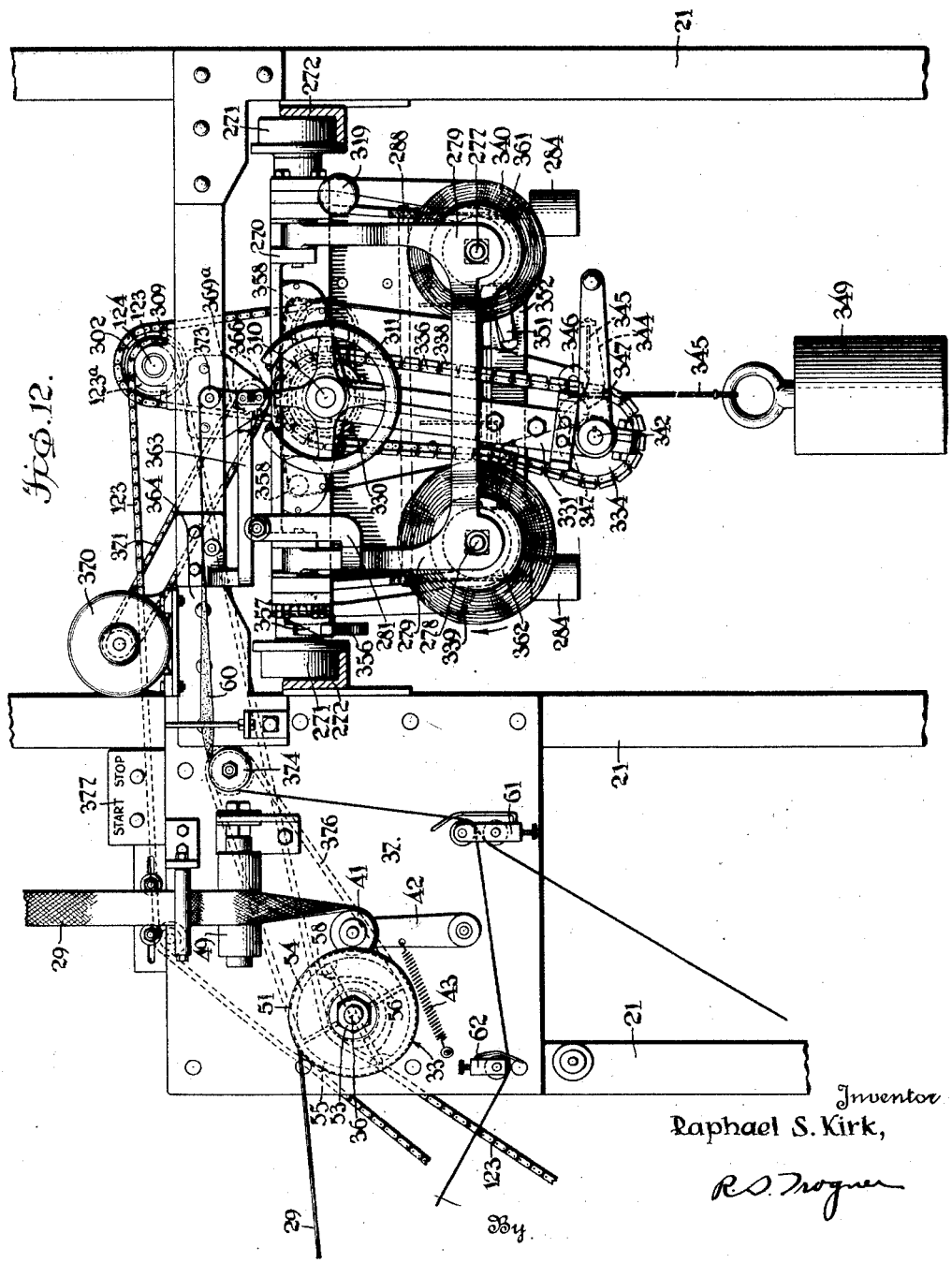
Inventor
Raphael S. Kirk,
By
Attorney

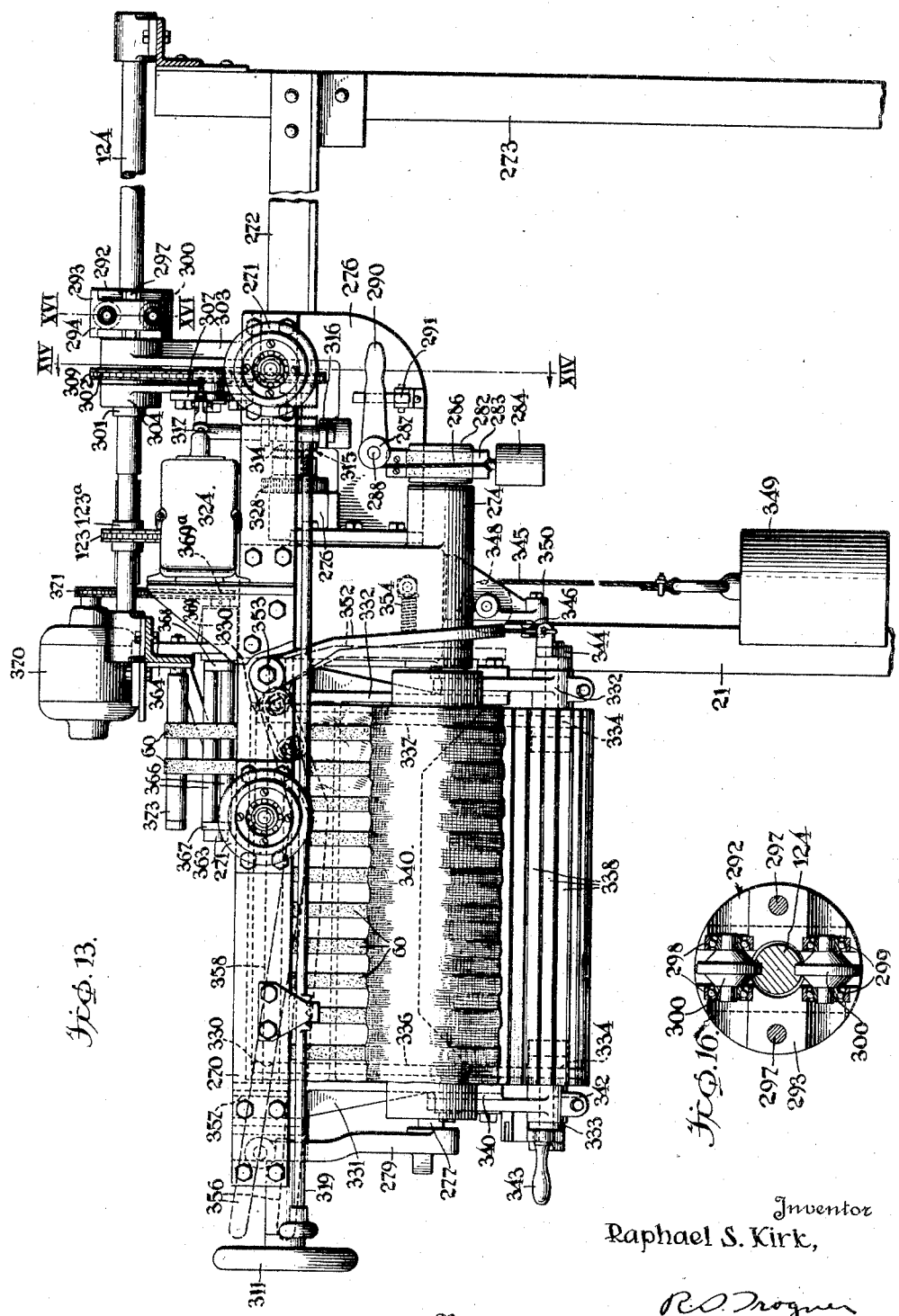

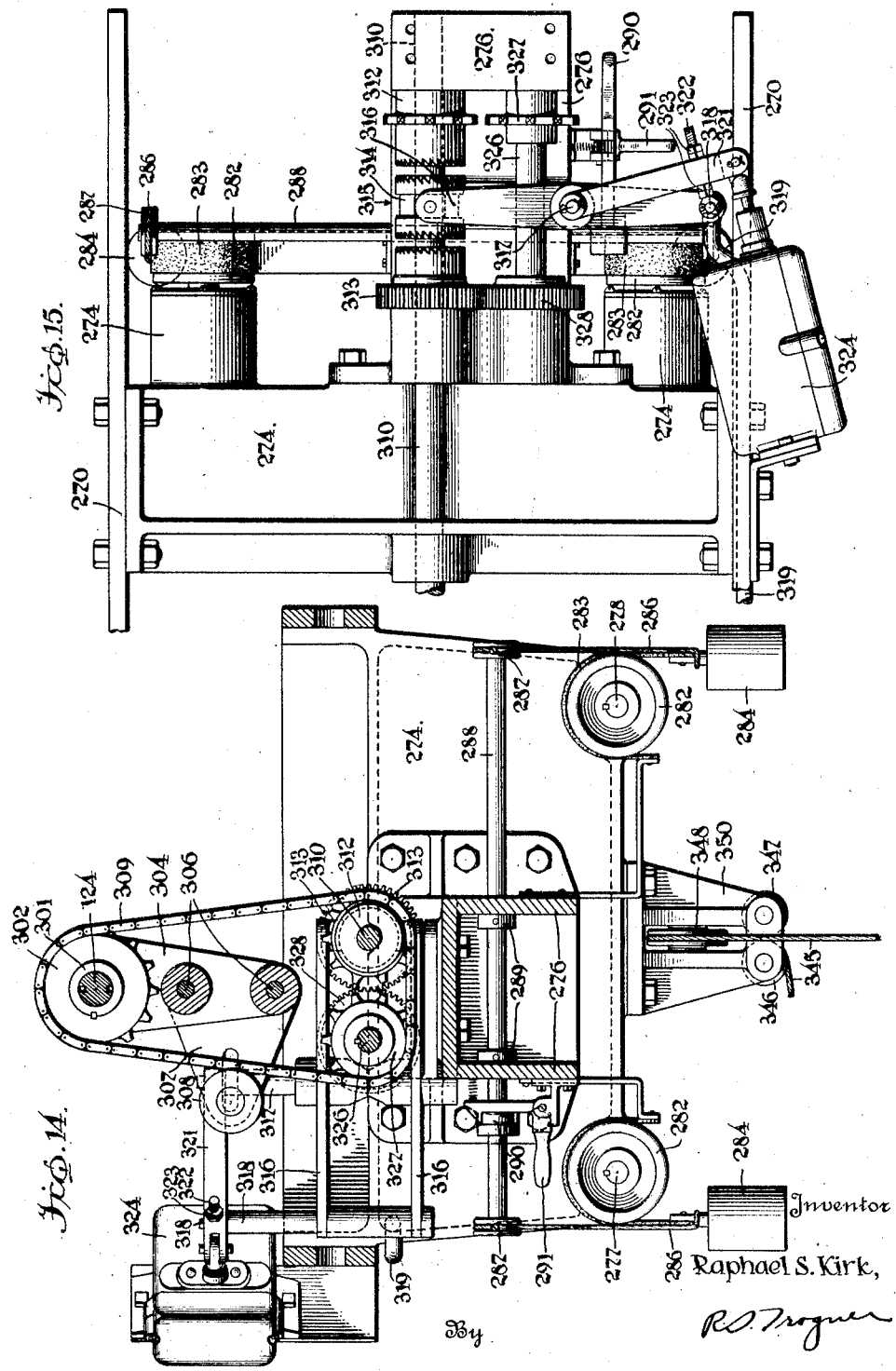

Feb. 23, 1932.       R. S. KIRK       1,846,260
CHAFING STRIP BUILDING MACHINE
Filed Sept. 16, 1926    12 Sheets-Sheet 11
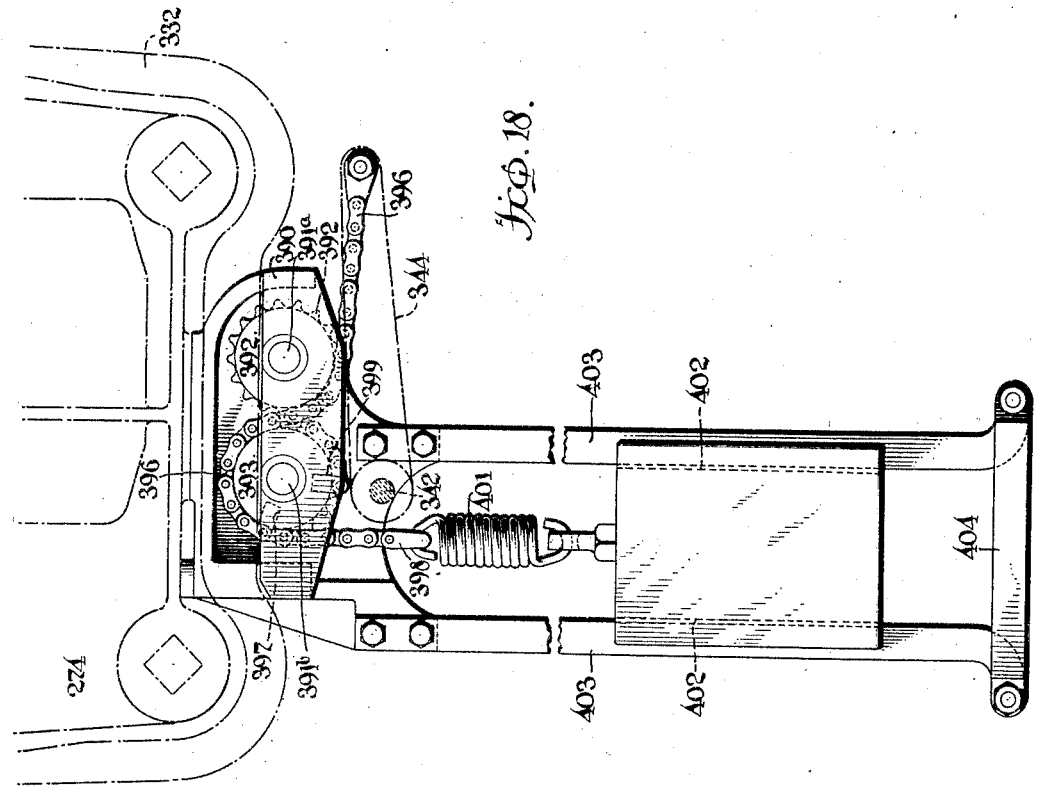
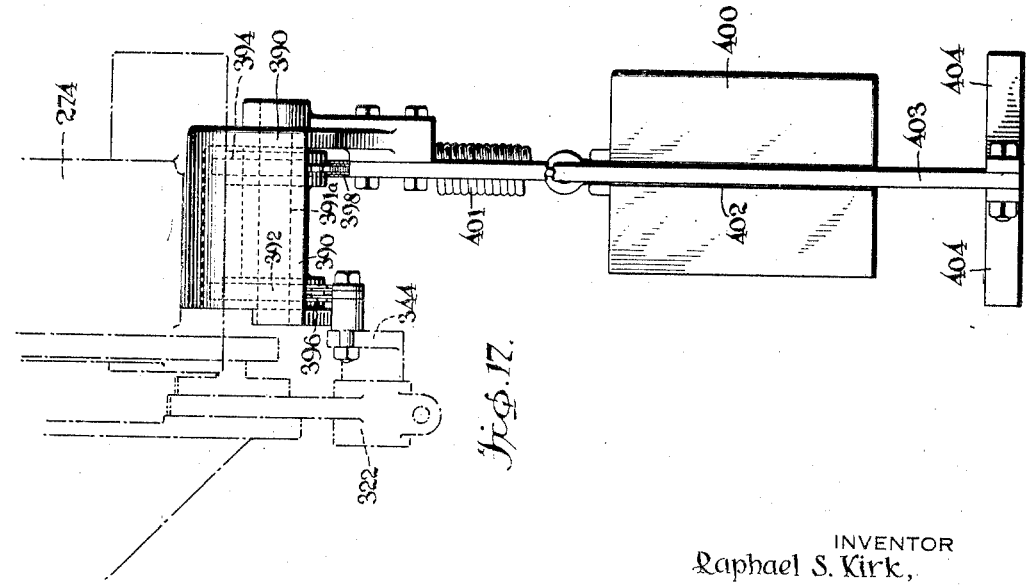
INVENTOR
Raphael S. Kirk,
BY
ATTORNEY Feb. 23, 1932.   R. S. KIRK   1,846,260
CHAFING STRIP BUILDING MACHINE
Filed Sept. 16, 1926   12 Sheets-Sheet 12
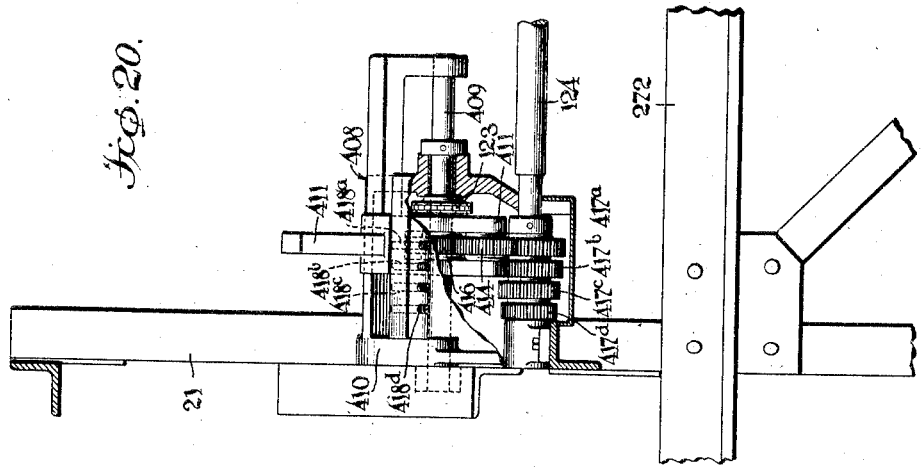
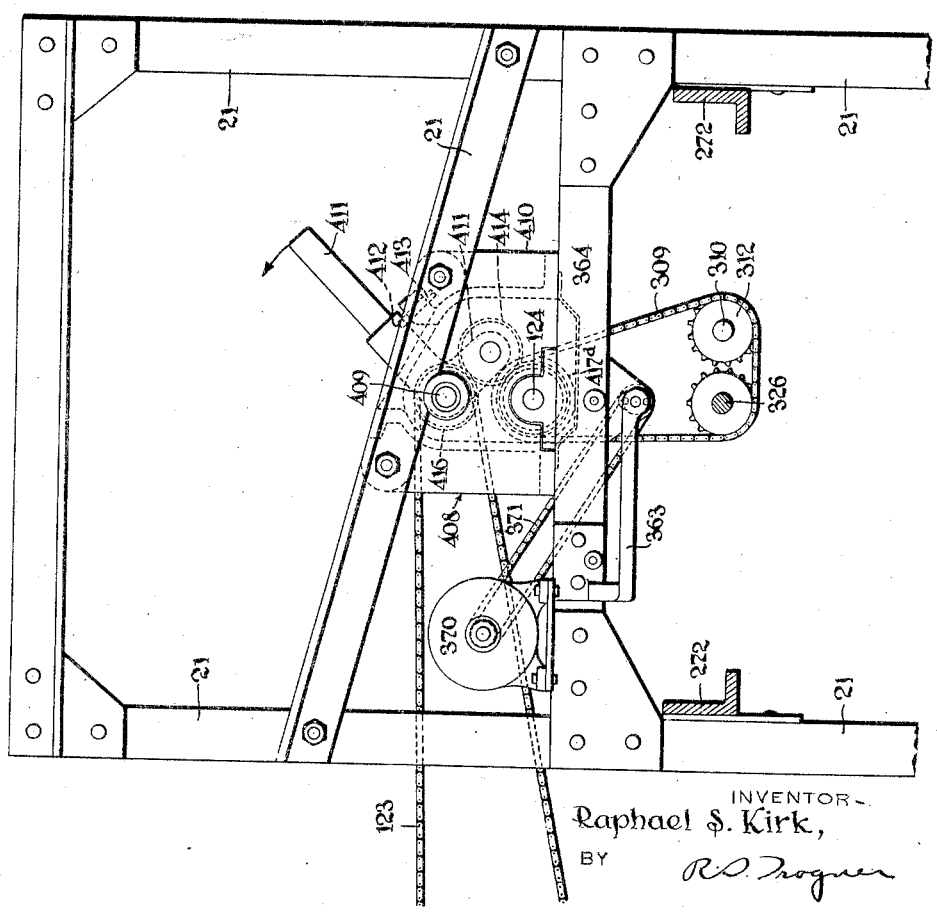
INVENTOR-
Raphael S. Kirk,
BY
ATTORNEY Patented Feb. 23, 1932

1,846,260

UNITED STATES PATENT OFFICE

RAPHAEL S. KIRK, OF AKRON, OHIO, ASSIGNOR TO THE GOODYEAR TIRE & RUBBER COMPANY, OF AKRON, OHIO, A CORPORATION OF OHIO

CHAFING STRIP BUILDING MACHINE

Application filed September 16, 1926. Serial No. 135,850.

My invention relates to a method and machine for manipulating rubber strips and rubberized fabric bands and it has particular relation to a method of and machine for fabricating chafing strips such as are commonly utilized in protecting the bead portions of pneumatic tires.

One object of my invention is to provide a method of continuously building chafing strips.

Another object of my invention is to provide a mechanical structure capable of fabricating chafing strips without manually arranging the component parts thereof.

A further object of the invention resides in the provision of a chafing strip building machine which is capable of manufacturing products of different dimensions, structure and arrangement.

Another object of my invention is to provide a method and machine for removing strips of unvulcanized rubber tissue from lined rolls thereof.

In order to protect the bead portion of a pneumatic tire from the wearing action of the rim upon which it is mounted, as well as to insure a safe anchorage of the bead in the plies of tire fabric, it is common practice to inclose this portion of the tire within what is known as a chafing strip. The strip consists of several superimposed bands of rubberized fabric and often includes one or more strips of unvulcanized rubber tissue. The length of the strip is dependent upon the size of the tire; whereas the number of layers of fabric, as well as of rubber tissue, depends largely upon the character and quality of the tire in which the product is to be incorporated. Under some circumstances it may be desirable to build a strip having only two layers of fabric with one of rubber, whereas under other circumstances this may be changed to three layers of fabric and two of rubber, or any other combination. Obviously, to meet these varying demands a machine is required that is readily capable of adjustment.

Heretofore, chafing strips have been built upon a rotatable drum by manually superimposing a plurality of layers of the building material. According to my invention I have provided continuously operated means for supplying a plurality of uninterrupted bands of fabric to a device for measuring and cutting the fabric into proper lengths. The lengths of material are superimposed and stitched together to form the fabricated product. If it is desired to interpose one or more gum strips, these are supplied to the fabric band before the cutting operation is effected, from a device which is adapted to unwind a lined roll containing the strips. It operates in conjunction with a member adapted to disengage the adhering liner from the unvulcanized rubber strip.

A better understanding of my invention may be had by referring to the drawings, in which:

Fig. 1 is a diagrammatic plan view of a machine embodying the principles of my invention;

Fig. 2 is a front elevational view, on a larger scale, of the main structure illustrated in Fig. 1;

Fig. 3 is a plan view, partially in cross-section, of the band measuring and cutting elements, together with the drive and timing mechanism;

Fig. 4 is a side elevational view of the structure illustrated in Fig. 3;

Fig. 5 is a front elevational view of the structure shown in Fig. 4, illustrating the relation of the measuring rolls and the cutting member, as well as the guiding and stitching elements;

Fig. 6 is a cross-sectional view, taken substantially along the line VI—VI of Fig. 4;

Fig. 7 is a cross-sectional view taken substantially along the line VII—VII of Fig. 4;

Fig. 8 is likewise a cross-sectional view taken substantially along the line VIII—VIII of Fig. 4;

Fig. 9 is a rear end-elevational view of the structure illustrated in Fig. 4;

Fig. 10 is a perspective view of a guide member;

Fig. 11 is a front elevational view of an auxiliary stitching roll illustrating its relation to the adjacent measuring rollers;

Fig. 12 is a front elevational view of the gum strip supplying device;

Fig. 13 is a side elevational view, partly broken, of the structure illustrated in Fig. 12;

Fig. 14 is a cross-sectional view, taken substantially along the line XIV—XIV of Fig. 13;

Fig. 15 is a plan view on a larger scale, of the reversing mechanism which operates the rewinding device of the gum strip supplying unit;

Fig. 16 is a cross-sectional view of the slidable collar taken substantially along the line XVI—XVI of Fig. 13.

Fig. 17 is a fragmentary side elevational view of a portion of the gum strip supplying device illustrating an alternative form of eccentric and weight mechanism;

Fig. 18 is a front view of the structure illustrated in Fig. 17;

Fig. 19 is a front elevational view, partially in cross-section, of a transmission mechanism for varying the relative rates of speed of the gum strip supplying device and the band measuring device; and Fig. 20 is a side elevational view, partly broken, of the device illustrated in Fig. 19.

The machine may be conveniently divided into several mechanical units which cooperate to perform the objects of the invention. These include means for supplying the materials including fabric band supplying means and rubber strip supplying means. Another portion of the structure serves to measure the fabric bands into lengths, which are subsequently severed and superimposed. The resulting product is then ready to be placed in so-called fabric lined books preparatory for transportation.

The band supplying means, as the name indicates, serves to provide continuous bands of fabric which are subsequently aligned, measured and cut into lengths. While the resulting band material is cut into lengths, the lengths remain intact, although they may readily be separated by subjecting the band to but a slight tensile force in the region of the cut portion. The cutting operation is similar to that of a rotary bias cutter, that is, the knife edge does not cut entirely through the fibrous material but merely mashes or crushes it. The crushing action is sufficient however to weaken the fibers, after which they may be parted without difficulty.

The continuous bands comprising the cut lengths are discharged in superimposed alignment, and are stitched together in a manner whereby the cut portions of the layers are staggered with respect to each other. Adjacent the staggered end portions of the superimposed product no stitching operation is performed in order that the overlapping ends of adjoining chafing strips may not adhere too tenaciously. When it is desired to incorporate one or more gum strips in the chafing strip product, the rubber tissue is supplied to and united with the individual bands before they are subjected to the action of the cutting members. The rubber tissue is supplied from a mechanism adapted to support a lined roll containing perhaps fifteen or twenty individual strips. By rewinding the roll repeatedly about two shells or spools, conveniently disposed, the desired number of strips may be removed which may then be conveyed to the vicinity of the band measuring and cutting means.

Band feeding device

This portion of the machine includes a trellis that comprises a plurality of vertically disposed angle-irons 21 which are maintained in alignment by cross members 22. Three horizontal members 23, 24 and 25, disposed at slight angles to each other, are provided with a plurality of roller members 27. Adjacent each of the end rolls, eye members 28a and 28b are mounted, through which bands of fabric 29 are conducted. These serve as guides for maintaining the bands in alignment with the rollers over which they are conveyed.

A book (not shown) of bias cut bands is disposed beneath each of the roller supporting horizontal members, where workmen join the ends of the several bands to form a continuous and uninterrupted band. When it is desired that the chafing strip product have two layers of fabric, it will be necessary to employ two books simultaneously. If, on the other hand, three layers of fabric are desired in the chafing strip product, three books should be employed. In the same manner any number of layers of fabric material may be utilized, depending upon the character of the finished product. The individual continuous band in each instance is conducted through the outer eye member 28a and is conveyed over the several idling rollers 27 in the direction of the measuring and cutting device.

Each band is respectively drawn over the rolls by individual supply or feed rollers 31, 32 and 33. The several feed rollers are driven at substantially identical peripheral speeds. Shafts 34, 35, and 36, provided for supporting the feed rollers, are journaled in vertical plate members 37 that are secured to the angle-irons 21. The shafts are rotated by means of a chain drive, to be described later. In order to insure frictional contact between the supply roller and the band, auxiliary rotatable members 41 are mounted upon arms 42 which are pivoted in the plate members 37. Each arm 42 is resiliently maintained in engagement with the respective driven rollers 31, 32 and 33 by means of a tension spring 43, one end of which is secured to the pivotable arm 42, whereas the other end is secured to the plate 37. Idler rollers are journaled upon the frame of the trellis at convenient points in order to guide the bands about various structural elements. For example, rollers 46 and 47 prevent the adjacent portions of the bands 29 from engaging each other. Likewise rollers 48 and 49 function similarly.

Although the several supply rollers are driven at a uniform peripheral speed, it frequently happens in practice, particularly when the stock is not uniform, that bands controlled by one of the supply units will be loose or slack, whereas bands controlled by another supply unit will be taut. In order to compensate for this undesirable condition, I have so designed the rollers 31, 32 and 33 that they are expansible and are adjustable at will. To this end a portion of each drive shaft of each roller is provided with a screw-threaded surface. The roller itself consists of several parts (see Fig. 12) including two parallel disc members 51 which form the outer portions. These disc members are loosely mounted upon the shaft but are maintained in alignment by nuts 53 screwed upon the shaft 36. Between the discs is interposed the roller proper which consists of two hemi-cylinders 54 and 55, which inclose the threaded shaft and have tapped registering openings 56 extending diametrically therethrough. A pin 58 passes through the shaft wherein it is freely rotatable, and is provided with threads disposed in opposite directions, which mesh with those of the tap holes in the hemi-cylinders. By rotating the pin, it is possible to cause the segmental cylindrical members 54 and 55 to separate or to approach each other, depending upon the direction of rotation. In order to change the effective circumference of any of the rollers 31, 32 or 33, the nuts 53 are first loosened, the pin 58 is then rotated in the proper direction to adjust the segmental members 54 and 55, after which the nuts may again be tightened.

A gum strip supplying device, to be hereinafter described in detail, supplies a plurality of gum strips 60 which are guided to the bands 29 by means of a plurality of rollers 61, 62, and 63 secured at proper locations upon the structural elements 21 and 37.

Having supplied the various chafing strip building materials, it is important that they be brought into the proper alignment. This is accomplished by means of guides 65 (Fig. 10) which are satisfactory for aligning either the gum strips 60 or the fabric bands 29. Each guide consists of a slotted plate 67 having a set of parallel end members 68 and 69 secured thereto. A narrow metal strip 71 is secured to the end members and is spaced from the plate 67. Two rollers 72 and 73 are disposed in the end members between which the band passes. The band is maintained in engagement with the end member 69 by an elongate leaf spring 74. One end of the spring 74 is rigidly secured to a pilot bar 76, while the other or free end thereof extends within a slot 75 provided in the guide. The pilot bar 76 is integrally joined to the collar 77 which encloses a screw-threaded shaft 78 that is rotatably disposed within bearings in the end members 68 and 69. To facilitate manual rotation of the shaft 78 a knob 79 is secured to one of its ends. The end member 69 is integral with a pin 81 that is adapted to fit reamed openings 82 (Figs. 5 and 11) provided therefor in a casting 91 of the assembling unit. The guide 65 is adapted to be secured in any position of adjustment by a set screw 83. For convenience, the lateral position of adjustment may be defined by a collar member 84 that surrounds the pin 81 and is secured thereto by a set screw (not shown). By inserting the pin 81 within the opening 82 so as to cause the collar 84 to engage or abut the casting 91 the guide 65 may be adjusted and secured in adjusted position by manipulating the set screws 83.

*Measuring, cutting and stitching device*

This portion of the machine will be described by following the path of the drive from the source of power. It includes a base or stand 90, upon which a plurality of castings are disposed. As best shown in Fig. 4, these castings house a plurality of shafts and structural elements, and for convenience, may be designated as follows: a front casting 91, a rear casting 92, an intermediate casting 93, and a differential mechanism 94.

The measuring and centering device unit is driven from a single source of power (not shown) by a link belt 96 which is trained over a gear 97. The gear is keyed to a shaft 98, one of whose ends is journaled in the rear casting 92, and the other end in the intermediate casting 93. A pinion 99 is likewise keyed to this shaft, which drives a gear 101 disposed directly above the pinion. This gear is keyed to a shaft 102 (Fig. 6) one end of which is rotatably supported in the intermediate casting 93 and the other end is likewise supported in a bracket 103 that is disposed adjacent the differential 94. A small sprocket 106 and a pinion 104 are keyed to this shaft. The former drives a large sprocket 108 disposed therebelow, by means of a chain 109. The pinion 104 drives a gear 111, which is keyed to a shaft 112. In order that the chain 109 may be maintained taut, an idler sprocket 113 is slidably disposed in a slotted bracket 114, which is secured to the intermediate casting 93. The large sprocket 108, which is driven by the chain 109 is keyed to a shaft 116 that is journaled in the outer casting 91 and the intermediate casting 93. This shaft drives a plurality of sprockets 117, 118 and 119 which are provided for the purpose of driving the auxiliary elements, such as the supply rollers 31, 32 and 33 and a gum strip removing device, to be described later. As best shown in Figs. 2 and 3, a chain 121 trained over the sprocket 117 rotates the shaft 35, which supports the supply roller 32, and the shaft 35 in turn is connected by another sprocket chain 122 to the shaft 34 supporting the upper roller 31. A chain 123, which is located immediately adjacent chain 121 rotates the supply roller 33 and also a main drive shaft 124, which operates the gum strip removing device.

Referring again to gear 111 which is keyed to the shaft 112, it will be observed that one end of the shaft 112 serves as an axle for the differential mechanism 94 where it is rotatably supported in a bearing 130. The other end of the shaft 112 extends to the front of the machine and is journaled in both the intermediate and the front castings. A steel collar 131 is keyed to the front end of the shaft 112, and serves as a measuring roller for one of the bands 29. A gear 132 is keyed to the shaft 112 between the front and intermediate castings and drives a gear 133, which is keyed to a shaft 134, the latter being housed in both the front and intermediate castings. The shaft 134 likewise is provided with a collar member 135 secured to a projecting portion of the shaft and serves as an additional measuring roller. It will be noted that these two rollers 131 and 135 are rotated continuously.

Below the rollers 131 and 135, is another set of shafts 137 and 138 provided with integral roller portions 137a and 138a, roller 137a being similar in construction to rollers 131 and 135, already described, whereas roller 138a, differs in that it has a helical knife 139 secured to its periphery. The latter shaft 138 is journalled within the castings 91 and 93. The portion of the shaft 138 intervening between its journal bearings is inclosed by a jacket or casting member 141 within which the shaft 138 is freely journaled. The jacket 141 is formed with an integral sleeve portion 142 which incloses a part of the same shaft projecting beyond the front casting. The jacket has a reamed opening to accommodate the shaft 137. The shaft 137 and jacket 141, including the sleeve 142 are pivotally supported about the shaft 138. Springs 143 and 144 engaging the jacket 141 serve to establish the proper relationship between adjacent rollers 131 and 137a. These springs are maintained at the desired degree of compression by supporting bolts 146 and 147, that are screwed in tap holes provided therefor in the outer and intermediate castings, respectively.

As best shown in Fig. 6, a bifurcated member 148 is bolted to the jacket 141 and a roller 149 is rotatably mounted within the bifurcated portion. The roller engages a cam 151 mounted upon a shaft 152. The cam, whose operation will be described more completely hereinafter, causes the arm 148 to oscillate, which, in turn, causes the shaft 137 to pivot about the shaft 138 as a fulcrum.

As has been already stated, one end of the shaft 137 has a collar 137a secured thereto, similar to the collar 131, for measuring bands. The end of the shaft 137 opposite that which carries the integral roller portion 137a is provided with a gear 153 keyed thereto, which meshes with a gear 154 that is keyed to the shaft 112. The pitch of the teeth of the gears 153 and 154 is sufficiently great to render them in mesh at all times with each other, notwithstanding the fact that they are adapted to move toward and away from each other. The shaft 137, as well as shafts 112 and 134, is rotated continuously.

Adjacent each of the measuring rollers 131, 135 and 137a an idler roller 156 is rotatably mounted upon a lever 157 which is pivotably secured in the front casting. Each idler roller is resiliently maintained in engagement with its measuring roll by a spring 158, which is compressed by an adjustable bolt or set screw 159 that is bracketed in the frame 91. The guide members 65 for the band and gum strip are adjusted to feed the strips of fabric and rubber material between the respective auxiliary rollers 156 and the measuring rollers 131, 135 and 137a. Due to the compressive action of the former, the gum strip 60 is securely stitched to the band 29. The idler rollers serve an additional purpose in that they insure frictional engagement between the strip and the measuring rollers, thereby drawing the stock through the guide members at an exactly predetermined rate.

A secondary stitching roller member 161 (Figs. 5 and 11) having a rubber body 162 and fabric surface is rotatably mounted on a lever 163 which is pivoted upon a bracket 164. The bracket is secured to the frame casting 91 and is provided with a set screw 166 adjustable to limit the extent of downward movement of the roller 161 when the measuring roller 137a which it normally engages, as indicated at 167, is pivoted or rocked downwardly. A coil spring 168 surrounds a setscrew 169, which is screwed into the bracket 164 and engages the opposite side of the lever 163. Thus the spring 168 functions to urge the stitching roll 161 in a counter-clockwise direction, as viewed in Fig. 11.

The several strips of fabric and rubber are aligned and joined in superimposed relation between rollers 137a and 131, which stitch the several layers together. Subsequently they pass between roller 137a and the secondary roller 161 which is resiliently urged against the former. To facilitate the separation of the overlapping stepped ends of adjoining strips, periodical oscillatory motion is imparted to the roller 137 whereby it is pivotally moved away from complementary stitching rollers 131 and 161, thus interrupting the continuous stitching operation which would otherwise result.

The cutting members are operated intermittently by mechanism to be described later, although at definite predetermined intervals, which may be varied if so desired. The timing mechanism which controls the interval for operation, as well as the elements which drive the cutting members, include the differential 94 which is of conventional design. This structure includes the axle shaft 112 and a second axle shaft 175 disposed in coaxial relation therewith. Beveled gears 176 and 177 are keyed to the adjacent ends of the shafts. These gears are interconnected by spider pinions 178, which idle upon stub shafts 179 that are secured in a housing 181. The latter incloses both the pinions, as well as the bevel gears. A ring gear 182 surrounds the housing which is rigidly secured thereto and meshes with a pinion 183 that is keyed to a shaft 184.

Normally and during the intervals when the cutting roller 138a is inoperative, the motion is transmitted from the beveled gear 176 through the pinions 178, to the beveled gear 177 that is keyed to the shaft 175. One end of this shaft 175 is supported by a bearing 186 of the differential and the other end is journaled in the rear casting 92. A brake drum 187 and a gear 188 (Figs. 3 and 9) are keyed to the shaft 175. That portion of the exposed side of the rear casting 92, which houses the end of the shaft 175, has a collar 189 cast integrally therewith. This collar is provided with a relatively rotatable member 191 having a recessed portion within which two intermeshing pinions 192 and 193 are rotatably mounted. The pinion 192 meshes with the gear 188, which is keyed to the axle 175. It will be observed that the member 191 may be pivoted through a considerable arc and that it is secured in the desired adjusted position by bolts 194 which pass through slots 196 provided therefor in the rear casting. The pinion 193, which meshes with its complementary pinion 192, likewise meshes with an interchangeable timing gear 197, shown in Fig. 9 by dot-and-dash lines. This gear controls the interval during which the cutting members remain stationary and, therefore, determines the length of the chafing strip product. The gear 197 is removably fitted and bolted upon a face plate 198 which is rigidly secured to a shaft 199, the latter being journaled in the rear casting and in an auxiliary bracket 201 (Fig. 3) that is secured to the differential casting 94. Timing gears of different sizes are adapted to be mounted on the face plate 198 in the same manner as the gear 197. The end of the shaft 199 projecting beyond the auxiliary bracket has a short rod 202 secured thereto in eccentric relation. The rod 202 imparts an oscillatory motion to a device 203 for counting the rotations of the shaft corresponding to the number of chafing strips produced.

As best shown in Fig. 7, a cam member 206 having an abrupt stepped portion is secured to the shaft 199. The surface of the cam is engaged by a pawl 207 which is pivoted upon a bracket 208 that is supported by a frame support 209 which is secured to the base portion 90 of the fabricating unit. The pawl 207 is at all times urged against the surface of the cam by a horizontally disposed coil spring 211, that engages the pawl below its fulcrum point. In order to control the compressive force of the spring 211 a nut 212 is provided which may be adjusted along a screw-threaded pin 213. The pin is secured to a vertically disposed standard 214 which constitutes a part of the frame support 209.

One end of a rod 216 is secured to the pawl below its fulcrum point by pin 217. The other end is pivotally secured to a bell crank lever 218, constituting a part of a brake mechanism 215 which includes the brake drum 187, already described. One end of a U-shaped member 219 is pivotally secured to the standard 214 by pin 220, whereas the other end is similarly secured to the bell crank by a pin 223. A brake shoe 221 is pivotally secured to the lower portion of the U-shaped member and a similarly constructed brake member 222 is disposed in an inverted position above the brake drum 187, one end thereof being secured to the standard 214. The other end of the brake member 222 is slidably disposed about a pin 223a pivotally secured to the bell crank lever by means of a pin 225 and which serves as a connecting member between the bell crank lever 218 and the brake members 219 and 222. As illustrated in Fig. 7, the brake is in a clamped position. When the brake is released, however, a spring 224 which rests upon a bracket arm 226, through which the pin 223a passes, raises the upper U-shaped member 222 and by actuation of the bell crank lever 218 the U-shaped member 219 is moved downwardly away from the drum 187.

It will be observed that the brake is clamped by what may be termed a floating pivot, that is, the bell crank member 218 does not have a stationary fulcrum. The pin 225 functions as a pivot to raise the U-shaped member 219, whereas pin 223, which joins the bell crank to the lower U-shaped member functions as a pivot to compress the spring 224 and to cause the upper brake shoe to engage the brake drum. Conversely, when the pawl 207 engages the annular portion of the cam 206, the releasing operation involves a similar dual pivotal action.

As best shown in Fig. 8, a collar 228 secured to the shaft 199 is freely encompassed by a cam 231 having a trip plate 232 bolted thereto. The cam is held in slidable contact with a radially disposed lug 229 by means of a collar segment 233 rigidly secured to the member 228 and disposed adjacent and relatively movable with respect to the trip plate 232. The cam 231 is provided with an integral lug 234, which is adjacent the radial lug member 229. These lugs 229 and 234 are separated by a spring 236, although the lug 234 may be actuated against the force of the spring through the agency of the trip member 232, without necessitating rotative movement by the shaft.

A bell crank 238 is pivoted about a pin 239 rigidly secured to the rear casting 92 of the frame. One end of a spring 241 engages an arm 238a of the bell crank and urges it in an anti-clockwise direction, as viewed in Fig. 8. The lower end of this spring is supported by a nut 242, threaded upon a bolt 243 that is contained in the tapped head of a stud shaft 244 secured in casting 92 of the frame. The bell crank is actuated by the cam 231 with which it is maintained in engagement by the spring.

The arm 238a of the bell crank 238 engages at intervals a cam 246 which is secured to the shaft 184. This cam, in turn, has bolted thereto a trip plate 247 similar to the plate 232 previously described in connection with the cam 231. The elongate portion of the trip plate 247 momentarily engages and actuates the elongate portion of the plate 232 during each revolution of the shaft 184.

In addition to the cam 246, there is secured to the shaft 184 another cam member 249 which is of a construction and contour similar to cam 206. A pawl member 251 is fulcrumed upon the frame member 209 and its lower extremity engages one end of a spring 252 that surrounds a threaded pin 253. The other end of the spring abuts an adjustable nut 254 which is screwed on the threaded pin 253. The spring 252 may be tightened or released by turning the nut 254 in the proper direction. Its sole function is to maintain the pawl 251 in contact with the surface of the cam 249. This portion of the machine, namely the cam 249 and pawl 251, serves merely to prevent the shaft 184, to which cam 249 is secured, from rebounding or reversing by reason of any jarring action that may be imparted thereto.

One end of the shaft 184 is provided with a hollow gear 256 rigidly secured thereto (Fig. 3), which embraces and rotates freely about a collar 255 that projects from the casting 93 and is integral therewith. The collar serves as a guide for the gear 256, which meshes with and drives a gear 257 (Fig. 6) that is keyed to the shaft 138. The hollow gear likewise meshes with a gear 258, which is keyed to the shaft 152. The relation of the shaft 138 has been described in connection with the pivoted measuring roller 137. The shaft 152 and its associate shaft 259, which is driven by the former through the gear 258 and gear 260, the latter being keyed to shaft 259, are journaled in the front casting 91 and intermediate castings 93. The shafts 152 and 259 extend beyond the casting 91 and are provided with collars or rollers 261 and 262, each having a helical knife 263 secured thereto, which operates in conjunction with measuring rollers 135 and 131, respectively, to perform the cutting operation. The cam 151, to which reference has already been made, is keyed to the shaft 152 and actuates roller 149 of the bifurcated arm 148, which is integral with the jacket 141. The jacket hinges about the shaft 138 and supports the shaft 137. It is from this source that intermittent pivotal movement is imparted to the measuring and stitching roll 137a.

*Gum strip removing device*

This part of my machine consists of a rectangular frame portion 270 that is supported by four ball bearing wheels 271, which are adapted to travel in rolling contact along two horizontal angle-iron tracks 272. The angle members are supported by vertical members 273, and by the trellis structure 21. A rear journal casting 274 (Fig. 14) forming a part of the frame 270 extends below the tracks 272. The frame 270 also includes a bracket 276 rigidly secured to the journal casting 274. Two horizontal shafts 277 and 278 are rotatably mounted in relatively long bearing sockets provided in the journal casting, the portions of the shafts extending therefrom being rectangular in cross-section. The front ends of the shafts are loosely disposed in a U-shaped member 279, which is pivoted to the rectangular frame 270. An L-shaped latch 281 is swingably mounted upon the frame and normally assumes a vertical position where it maintains the U-shaped member 279 in engagement with the ends of the shafts 277 and 278. The rear ends of the shafts 277 and 278 project a short distance beyond the journal casting 274 and are provided with brake pulleys 282 secured thereto. A leather band 283, one end of which is secured to the bracket 276 passes about each pulley 282. The other end of the band has a weight 284 suspended therefrom. In addition to the leather band, each weight is supported by a cord 286, which is trained over a small wheel 287 directly above the weight. A shaft 288 is rotatably supported in the bracket 276 and is provided with two collars 289 that are secured thereto in order to obviate lateral play. The shaft 288 supports the wheels 287 which are keyed to its ends, together with a small hand lever 290. The lever is adapted to engage an L-shaped latch 291 that is fulcrumed upon the bracket 276. In order to lower the weights 284 and thereby cause the brake band 283 to engage the pulley 282, the latch 291 is swung in a clockwise direction, as viewed in Fig. 14, whereby it will escape engagement with the lever 290.

As best shown in Figs. 1 and 2, power is supplied to the gum strip removing device through the chain 123 from the auxiliary drive shaft 116, already described. The chain 123 drives a sprocket 123a, which is keyed to the splined shaft 124 that is journalled at each end in the angle-iron frame structure 273. A collar 292 is mounted on this shaft which consists of two sections 293 and 294 that are held together by pins 297 (Figs. 13 and 16). The sections are machined to accommodate, when united, two sets of ball bearings 298 and 299, which rotatably support a set of rollers 300 whose peripheries mesh with the splined portion of the shaft 124. By this construction axial movement of the collar along the shaft 124 is facilitated while the collar is driven by the shaft.

A sleeve 301 is loosely mounted on the shaft 124 and is made unitary with the driven collar 292. A sprocket 302 is keyed to this sleeve. On one side of the sprocket 302 the shaft 124 is enclosed by a journal bracket 303 which constitutes an upper integral portion of the bracket 276. On the other side of the sprocket 302 an arm 304 is loosely disposed about the shaft 124 and is joined securely to the bracket 303 by pins 306. A slotted plate 307 rigidly secured to the arm 304 adjustably supports a slack take-up idler roller 308 that engages a chain 309 trained about the sprocket 302.

A main shaft 310 of the device is rotatably supported at its extreme rear end by the bracket 276. The shaft 310 also extends across the frame casting 274 and is rotatably journalled therein. A hand wheel 311 is rigidly secured to the front end of the shaft 310. Also a sprocket 312 and a gear 313 are rotatably mounted thereon adjacent the rear end thereof. Adjacent hub portions of the sprocket and gear have serrated edges which are adapted to be engaged by cooperating serrated portions of an annularly recessed collar 314 which is slidably keyed to the shaft 310. The members 312, 313 and 314 constitute a clutch mechanism generally designated by the numeral 315. The collar 314 is actuated laterally by two arms 316 which engage the recessed portion on opposite sides thereof. These members are fulcrumed about a vertically disposed stud shaft 317 that is secured in the bracket 276. The opposite ends of the links 316 are interconnected by a pin 318 to which a rod 319 is secured that extends to the front of the machine (Fig. 13). An additional link 321 is pivoted about the stud shaft 317 and is adjustably mounted upon a pin 322, the latter being pivoted to the pin 318. Nuts 323 are positioned on opposite sides of the link 321 to secure the same in any desirable adjusted position. The extreme end of the link is joined to an electrical circuit reversing device 324 whose function will be described later.

A relatively short shaft 326 disposed adjacent and parallel to the rear portion of the main shaft 310 is journaled at both ends in the bracket 276 that is bolted to member 274. A sprocket 327 having the same number of teeth as sprocket 312, is keyed to the shaft 326 and is driven by the chain 309. Also a gear 328 keyed to the shaft 326 meshes with the gear 313, these two gears being exactly the same size. From this construction it will be observed that the sprockets 312 and 327 are always rotated in the same direction by the chain 309. When the collar 314 engages the sprocket 312, the shaft 310 will be rotated in the same direction as the sprocket itself. When, however, the collar 314 is shifted by sliding the rod 319 so as to actuate the link 316, the collar engages the serrated portion of the gear 313, and rotative motion is transmitted from the shaft 326 through the gear 328 to rotate the shaft 310 in the direction opposite that just described.

Two sprockets 330 mounted in spaced relation are rigidly secured to the shaft 310. Also, two arms 331 and 332 are pivotally suspended from this shaft. Adjacent the lower ends of the arms, bearings are provided which rigidly support the ends of a tubular shaft 333. Two sprockets 334 are freely rotated about the tube 333 and are driven by chains 336 and 337 trained about the respective sprockets 330. The corresponding links of these chains have secured thereto individual transversely disposed bar or slat members 338 having knurled outer surfaces. This construction constitutes a so-called caterpillar which serves as a rewinding mechanism for fabric liner rolls 339 and 340 having gum strips 60 wound therein, the manipulation of which will hereinafter be described.

The tubular shaft 333 serves as a bearing for a rod 342, which is provided with a handle 343 keyed to one end thereof and a lever 344 rigidly secured to the other end thereof. One end of the lever 344 is provided with a cable 345 which passes between two grooved pulleys 346 and 347 which are rotatably mounted upon a bracket 350 secured to the lower portion of the member 274. From these pulleys the cable is trained over a pulley 348, which is mounted upon the bracket 350 similarly to pulleys 346 and 347. A weight 349 is suspended from the free end of the cable. By reason of the force of this weight and the position of the lever 344, the caterpillar is maintained at an angle to the vertical. When it is desired to pivot the caterpillar away from either one or the other of the liner rolls 339 or 340, the operator imparts a quick downward movement to the lever 344 by means of the handle 343. As illustrated by the position of the mechanism as shown in Fig. 12, the end portion of the cable 345 attached to the lever 344 is disposed in a horizontal position and the cable therefore exerts a force upon the caterpillar tending to swing it in a clockwise direction about the shaft 310. Because the lever 344 is eccentric with respect to the adjacent portions of pulleys 346 and 347, between which the cable must pass, the weight 349 is necessarily raised somewhat by the downward movement of the lever. Continued pivotal movement of the lever beyond the vertical position will change the direction of the horizontal component force exerted on the cable 345 by the weight 349 and will thereby swing the pivoted caterpillar in an anti-clockwise direction and the weight will simultaneously be lowered.

Another form of the eccentric mechanism is illustrated in Figs. 17 and 18. It differs from the other embodiment in that an auxiliary journal member 390 is provided, which is rigidly secured to the casting 274 and which journals two parallel shafts 391a and 391b. A sprocket 392 is keyed to shaft 391a, and is aligned with a similar sprocket 393 that is keyed to the other shaft 391b. In addition, a third sprocket 394 is provided which is keyed to the shaft 391b. One end of a chain 396 is secured to the end of the eccentric arm 344, and is trained between the aligned sprockets 392 and 393; the other end of the chain 396 is rigidly secured to the sprocket 393 at 397. A second chain 398 is provided which is trained over the sprocket 394; one of its ends being secured to the sprocket at 399, whereas the other end suspends a weight 400 which is connected thereto by means of a coil spring 401. The weight has two parallel grooves 402 machined therein to receive two suspended vertical guide members 403 which are bolted to the auxiliary journal 390. These guides are maintained in spaced relation by means of two cross links 404 which are rigidly secured thereto.

The operation of this embodiment is not unlike that described above. The arm 344 is disposed in eccentric relation with respect to the aligned sprockets 392 and 393; thus the weight 400 is raised and lowered each time the arm is pivoted, for the purpose of shifting the caterpillar into engagement with one or the other of the rolls of fabric 339—340.

The arc through which the caterpillar may be pivoted is limited by protruding lug portions 351 which are integral with a U-shaped member 352 that is pivoted upon the rectangular frame 270, as indicated at 353 (Fig. 13). The lugs engage the rear arm member 332. In order to cushion the swinging movement of the U-shape member 352 in a clockwise direction, as viewed in Fig. 12, a coil spring 354 is provided, one end of which engages the U-shape member and the other end of which is secured to the casting 274. During the normal operation of the device, it is not necessary that the pivotal movement of the caterpillar be restricted by the lug members 351, therefore, the U-shape member bearing the lugs may be swung out of engagement with the arm 332 by lowering a lever 356, that is secured thereto at its fulcrum point 353. A triangular latch 357, which is secured to the rectangular frame member 270 maintains the lever 356 in a lowered position. The lever is sufficiently resilient to be sprung horizontally out of contact with the triangular member when it is desired that the lugs 351 be rendered operative.

Two elongate idler rollers 358, which are parallel to the drive shaft 310 are disposed within the rectangular frame member 270. The portion of the roll 340 containing the strips of gum 60 is trained and is guided by the rollers 358. The liner is wound about shells 361 and 362, which are provided with rectangular sockets adapted to be removably positioned upon the rectangular portions of the shafts 277 and 278, respectively. Preparatory to operation of the machine, one full roll including the shell is slipped on one of the shafts 277 and 278, whereas an empty shell is mounted upon the other shaft. The liner is conducted over the two idler rollers 358, as well as over the top of the caterpillar and is wound about the empty shell or spool in a manner as illustrated in Fig. 12.

In removing the strips of rubber 60 the liner is alternately wound about one spool and rewound about the other until the supply of strips is exhausted. It will be observed that the caterpillar engages the roll, which is being wound, thereby leaving the other roll free to unwind, with only the weighted brake band 283 to resist its rotary movement.

Immediately above the caterpillar an L-shaped bracket 363 is secured to an angle-iron 364, forming a part of the trellis frame 21. Two cylindrical members 366 are both rotatably mounted between two spaced members 367 and 368. One of these members 367 is journaled in the L-shaped bracket 363, whereas the other member 368 is journaled in a housing 369, that is secured to the angle iron 364. A sprocket 369a is keyed to one end of the member 368 and is provided with a chain 371 which is driven by a motor 370. The motor is mounted upon the stationary angle member 364. When energized, the motor causes the roller members 366 to revolve rapidly about the axis of the sprocket 369a. The rollers engage the strips 60 and impart a beating action thereto adjacent the points where they are separated from the liner, before it is conducted over a roller 373, which is rotatably mounted upon the frame member 364. The beating action that is imparted to the strips by the revolving rollers 366 serves to peel the plastic rubber material away from the liner without injuriously distorting the plastic strip. The separated strips are conducted to a knurled roller 374, which is rotatably mounted in the plate member 37 and which is rotated by a sprocket chain 376 driven by the shaft 36 of the supply or feed roll 33.

It will be observed that with the exception of the small motor 370 and the rotatable rollers 366, together with the splined shaft 124, the entire gum strip removing device is movably mounted on the rectangular frame 270, which is supported by the four wheels 271. From this construction it is apparent that the gum strips 60 of the stock roll are adapted to be aligned with respect to the revolvable roller members 366 and at the same time to maintain the disengaged product in aligned relation with respect to the several bracketed rollers 373 and 374. It will also be observed that when the stock roll has been unwound to the end of the gum strip, the operation of the machine is temporarily suspended, during which suspension the end of the next strip is joined to the end of the one preceding. The caterpillar is then pivotally swung into engagement with the unwound roll by thrusting the handle 343 downwardly in a manner already described. By actuating the rod 319, which operates the clutch mechanism 315, the collar 314 is moved in the proper direction to reverse the direction of travel of the caterpillar about the sprockets 330 and 334. Simultaneously with this adjustment the electric circuit reversing mechanism 324 which engages the link 321 is actuated to reverse the flow of current through the small motor 370. This operates to change the direction of rotation of the motor drive shaft and hence the direction of rotation of the rollers 366. When the liner is being wound about shell 362 the sprocket 369a driving the roller members 366 is rotated in a counter-clockwise direction, as viewed in Fig. 12. The gum strips 60 pass on the right hand side of the revolving rollers 366 and are conducted directly to the idler roller 373. The reverse is true when the liner is being wound about the other shell 361, that is, the rollers 366 are revolved in a clockwise direction and the strips 60 pass to the left hand side of the rollers 366 as they are conducted to the idler roller 373.

When the supply of gum strips on the lined stock roll is exhausted the liner will have been wound almost completely about one of the single shells 361 or 362, after which the lug member 351 is brought into operative relation with the rear arm 332 by pivoting the lever 356 upwardly. The latch 281 is subsequently swung out of engagement with the U-shaped member 279 which is pivoted outwardly through an angle of 180°. This enables the operator to slide the shell, together with the wound liner from the rectangular portion of one of the shafts 277 or 278, according to which one the liner has been wound upon. A new roll is then inserted before the U-shaped member is swung into engagement with the ends of the shafts 277 and 278. The end of the liner of the new roll is conducted about the idler rollers 358 and is manually wound about the empty shell. The caterpillar is then permitted to engage the empty shell by lowering the lever 356 thereby pivoting the lugs 351 out of engagement with the arm 332. The end of a strip of gum of the new roll is then joined to the end of the last gum strip of the previously exhausted roll, after which the operation of the device may again be resumed. For sake of convenience the small motor 370 which drives the revolvable rolls is energized by operating an individual switch 377, although its direction of rotation is controlled by the mechanism 324, described in connection with the clutch member 315. The rewinding elements, including the caterpillar, are driven by the chain 123 connected to the fabricating unit, the rolls 131, 135, and 137 thereof being so arranged as to be driven at the same peripheral speed as the peripheral speed of the caterpillar. Thus the strips 60 are supplied to the rolls 131, 135 and 137 at the same speed as they are unwound from the rolls 339 and 340.

A horizontal shaft 379 provided with a drum 380 is rotatably mounted upon the lower portions of the trellis members 21 and is also provided with a beveled gear 381 which meshes with a gear 382 likewise rotatably secured to the trellis members 21. The shaft 379 is driven by a sprocket chain 383 which is operatively connected to the shaft 116 and to the gear 382. A conveyor belt 384, extends upwardly at an incline from the drum 380 to an idler pulley 385 journaled in a frame member 387. Additional rollers 386 disposed in substantially the same horizontal plane as the roller 385 are also journaled in the frame 387. The portion of the belt 384 extending over the rollers 385 and 386 provides a horizontal surface adapted to convey the assembled chafing strips composed of the strips 29 and 60 from the machine in order that operators may separate the prepared finished strips and insert them in liner books or otherwise dispose of them. The belt 384 is driven at a linear speed which is substantially the same as that of the measuring rollers. Rolls 388 and 389, which are journalled to one of the vertical members 21, are so disposed as to guide and convey the laminated strip into alignment with the belt 384.

In order to vary the rate at which gum strip material is supplied to the measuring mechanism, a transmission 408, such as that illustrated in Figs. 19 and 20, may be employed. The chain 123 which drives the shaft 124 of the gum strip supplying device rotates an auxiliary shaft 409, which is journaled in a housing 410, that is secured to the angle-irons 364 and 21. A bifurcated bell crank lever 411 is fulcrumed about the shaft 409. The upper arm of the bell crank serves as a handle and is provided with a recessed portion 412. The other arm of the bell crank rotatably supports an idler gear 414, which meshes with a similar gear 416 that is slidably keyed to the shaft 409 and is contained within the bifurcated portion of the bell crank 411. The idler 414 may be pivotally moved into engagement with any one of four gears 417a, 417b, 417c and 417d, which are keyed to the principal shaft 124, each of these gears being provided with a different number of teeth. Four set screws or pins 418a, 418b, 418c and 418d are provided which are disposed in aligned relation with respect to the four gears and are contained in a tapped bar that is integral with the housing 410. These pins are adapted to selectively engage the recessed portion of the bell crank 411 and thereby insure proper lateral adjustment thereof.

It will be observed that the gear ratio between the measuring mechanism and the gum strip removing device may be varied by merely pivoting the bell crank in the direction indicated by the arrow shown in Fig. 19 until the idler gear 414 will no longer engage one of the gears 417a, 417b, 417c or 417d keyed to the shaft 124. At the same time the arm of the bell crank escapes engagement with the pins, after which the bell crank unit may be shifted along the shaft 409 until it is aligned with the gear having the desired number of teeth. In other respects the operation of the device is identical with an embodiment not including a transmission mechanism 408.

*Operation*

In operating my machine, workmen are employed to join the ends of the bias cut fabric to form the continuous bands 29 which are conducted through the eye brackets 28a over the rollers 27, through the eyes 28b and thence to the supply or feed rollers 31, 32, and 33 in the manner already described. The bands 29 are supplied by the feed rollers to the guides 65 at substantially the same rate as, or a slightly greater rate than, the peripheral speed of the measuring rollers 131, 135 and 137. As a matter of safety, it is advisable to feed the strips 29 from the rollers 31, 32 and 33 at a slightly greater rate of speed than the peripheral speed of the measuring rollers in order to insure an adequate supply of band material. When the reserve or slack material between the feed rollers 31, 32 or 33 and the guides 65 becomes too great it may be diminished by temporarily swinging the auxiliary roller 156 out of engagement with the feed roller and restraining the travel of the band until the excess material has been fed to the measuring rollers.

The several guides 65, through which the gum strip and fabric bands must pass are adjustably disposed so as to insure proper disposition of the bands upon each other. This condition is realized by setting the abutting collar 84 which is secured to the stud shaft 81 of the guide member in the proper position, and securing the shaft in the front casting 91 by means of the set screws 83. The bands 29 are aligned and fed between the measuring rollers 131, 135 and 137 to form a laminated strip, the edges of the laminations being disposed in stepped relation. The distance between the edges is adapted to be varied by adjusting the guides 65.

The measuring rollers 131, 135 and 137, as has already been described, are rotated continuously. The shaft 98 is driven directly from the motor (not shown) by means of the chain 96. The shaft 98, in turn, drives shaft 102, through the agency of the pinion 99 which is secured to the former, and the large gear 101 which is secured to the latter. The pinion 104, which is keyed to the shaft 102, rotates the gear 111, the latter being keyed to the shaft 112 that rigidly supports the measuring roll 131. The roller 135 is mounted upon the shaft 134 and is driven by gears 132 and 133, which are secured to the shafts 112 and 134, respectively. The lower measuring roller 137a, together with its shaft 137, is driven by gears 153 and 154, which are keyed to the shafts 137 and 112, respectively. The teeth of these gears 153 and 154 are relatively long in order to permit the lower shaft 137 to pivot through a slight arc without interruption of its rotatory movement.

In order that the cutting rolls 138a, 261 and 262 may be actuated at the proper interval, and in order that this interval may be varied, whereby the length of the product may be varied, the adjustable gear train 188, 192, 193 and 197 and the differential mechanism 94 has been provided. Normally, that is when the knife members are stationary, the driving force through the differential 94 is transmitted from the axle 112 to the axle 175. The second axle 175 carrying the gear 188 extends through the rear casting 92 and is thereby interconnected to the main timing gear 197 by the idler pinions 192 and 193, which are rotatably supported in the pocket of the adjustable casting 191. This casting, as has already been noted, may be rotated through the arc described by the slotted portions 196 of the rear casting, in order that timing gears 197 of differing diameters may be accommodated. The timing gear rotates the short shaft 199, to which the cam members 206 and 231 are secured. The direction of rotation of the shaft 199 is indicated by the arrow A shown in Fig. 8.

Each complete revolution of the timing gear causes the pawl member 207 to engage the stepped portion of the cam 206 against which it is urged by the spring 211, and clamps the brake shoes 221, through the medium of the bell crank 218 and rod 216. This results in arresting rotation of the shaft 175. At this stage of the operation the arm 238b of the bell crank 238 engages the higher portion of the cam 231, and the other arm 238a of the bell crank 238 will have been pivoted in a clockwise direction (Fig. 8) against the tension of the spring 241 until the arm 238a escapes the higher point of the cam 246, which is keyed to the shaft 184.

The brake 215 having been clamped to arrest rotation of the shaft 175, the drive circuit through the differential 94 is reversed, whereby the ring gear 182, together with the housing 181 of the differential is rotated. The gear 182 meshes with the pinion 183, thereby driving the shaft 184 which is provided at its rear end with the cam 246. The hollow gear 256, which embraces the collar 134 actuates gears 257 and 258, which are secured to the cutting roller shafts 138 and 152. Gear 258, in turn, is in mesh with gear 260 that is keyed to the cutter roll shaft 259. The shaft 184, which is geared to each of the cutting rollers 138a, 261 and 262, to drive them at the same rate of speed, makes one complete revolution during which the helical knives 139 and 263 engage the adjacent measuring rollers to crush or mash, but not to sever, the bands of fabric.

When gum strips 60 are employed they are also subjected to the action of the knives, as they are stitched to the bands before reaching the location of the knives. The relative position of the knives 139 and 263 is such that the lines along which the bands are transversely or diagonally cut are disposed in stepped relation after the bands have been superimposed between the rollers 131 and 137a. If it is desirable to vary the stepped relation of the cutting lines on the bands the rollers 138a, 261 and 262, together with their supporting shafts may be remounted so as to provide different relative positions of the knives 263 from those shown in Fig. 5. Each of the unitary bands which has been cut to proper lengths is conducted between measuring rollers 131 and 137a and subsequently between the rollers 137a and 161.

As soon as the cutting rollers begin to rotate, the cam member 151 begins to operate against the upper end of the arm 148 thereby pivoting the roller 137a downwardly away from the rollers 131 and 161. The cam 151 does not release the arm 148 until the cut portions of the several superimposed bands 29 have passed beyond the roll 161. Thus the cut portions of the several bands are not stitched together and the laminated strip is then adapted to be manually divided along the cut portions to form individual laminated chafing strips. As soon as the cam 151 releases the arm 148 the stitching operation is resumed until the next cutting operation occurs.

While the shaft 184 is rotated, the trip member 247, which is secured to the cam 246, engages the trip plate 232 which is secured to the opposite cam 231, thereby imparting a rotative movement to the cam 231, against the force of the spring 236, in the direction indicated by arrows B and C (Fig. 8). This movement of trip members 232 and cam 231 permits the arm 238b of the bell crank 238 which is constantly urged in a counter-clockwise direction by the spring 241, to pivot in a counter-clockwise direction (Fig. 8), and to engage the recessed portion of the cam 231. Continued movement of the shaft 184 will thereafter be interrupted when the arm 238a of the bell crank engages the notched portion of the cam 246 in the position shown in Fig. 8.

In this position of the cam member 246 rotation of the shaft 184 is positively stopped and the direction of drive through the differential 94 is then automatically changed to transmit rotative force to the shaft 175 even against the retarding action of the clamped brake mechanism 215. As soon as the shaft 175 begins to rotate the shaft 199 is also rotated in a manner above described and the pawl 207 is actuated by the cam 206 to release the brake mechanism 215. The shaft 199, together with the timing gear 197 will continue to rotate until it has completed another revolution, during which the bell crank 238 will again be rocked in a clockwise direction by the cam member 231, and the pawl 207 will again actuate the brake mechanism 215.

The primary function of the pawl 251 and cam 249 is that of a safety. The pawl engages the recessed portion of the cam at the instant that the adjacent co-axial cam 246 abuts against the arm 238a. Thereafter it will be observed that the shaft 184 can neither rotate in a clockwise nor counter-clockwise direction until the succeeding cycle of operation begins.

The device hereinabove described is susceptible to many modifications. Certain characteristics are outstanding however. For example the number of superimposed strips may be varied by utilizing the desired number of measuring and cutting rollers. Also, additional gum strips may be supplied, and, if it is desired that gum strips of more than one width be employed, a second gum strip supplying device may be provided on the opposite side of the machine from the one shown and described.

Although I have illustrated but the preferred forms which my invention may assume and have described in detail the application of those forms, it will be apparent to those skilled in the art that the invention is not so limited but that various modifications and changes may be made therein without departing from the spirit of the invention or from the scope of the appended claims.

What I claim is:

1. A chafing strip building machine comprising a plurality of rollers for measuring and superimposing a plurality of bands, means for continuously driving the rollers, a plurality of cutting members, and means for operating the cutting members in adjustably timed relation to the respective rollers whereby the cuts in the superimposed bands will be in stepped relation.

2. A chafing strip building machine comprising a plurality of rollers for measuring and superimposing a plurality of bands, means for continuously driving the rollers, a plurality of cutting members, means for operating the cutting members in adjustably timed relation to the respective rollers whereby the cuts in the superimposed bands will be in stepped relation, and means for stitching portions only of the superimposed bands together.

3. A machine for building laminated strips comprising means for continuously supplying a plurality of strips thereto, means for partially severing the strips into variable predetermined lengths, means for superimposing the strips, and means for uniting portions only of the superimposed lengths.

4. A multi-ply strip building machine comprising continuously rotated rollers for measuring bands of strip material, intermittently operated cutting members coacting with the measuring rollers for partially severing the measured bands, the measuring rollers being so arranged as to superimpose the partially severed bands, and a member for stitching the bands together intermediate the points of partial severance thereof.

5. A machine for building chafing strips including united layers of unvulcanized rubber and fabric, comprising means for continuously supplying fabric bands thereto, a mechanism provided with a liner roll having unvulcanized rubber strips wound therein, means for disengaging the unvulcanized rubber strips from the liner roll, guide members for aligning the several strips and bands, means for uniting the rubber strips with the bands to produce multi-ply strips, knives for partially severing the multi-ply strips into predetermined lengths, means for superimposing the partially severed strips, and means for stitching together the multi-ply strips intermediate the points of partial severance.

6. A chafing strip building machine comprising continuously rotated rollers for measuring bands of chafing strip material, a brake mechanism, means for actuating the brake mechanism in timed relation with the rotation of the rollers, a differential mechanism controlled by the brake mechanism, and a band cutting means driven by the differential mechanism.

7. A multi-ply strip building machine comprising continuously rotated rollers for measuring bands of strip material, a brake mechanism, means for actuating the brake mechanism in synchronized relation with the rollers, a differential mechanism controlled by the brake mechanism, means operated by the differential mechanism for partially severing the strips, the measuring rollers being so arranged as to superimpose the strips of material, and a stitching member operable in conjunction with the rollers for uniting portions of the superimposed strips of material.

8. A multi-ply strip building machine comprising a fabric strip measuring roller, means for continuously driving the measuring roller, a strip cutting member, and an adjustable timing mechanism for intermittently operating the cutting member in coactive relation with the measuring roller to partially sever the strip into predetermined lengths.

9. A multi-ply strip building machine comprising a fabric strip measuring roller, means for continuously driving the measuring roller, a strip cutting member, and an adjustable timing mechanism for intermittently operating the cutting member in coactive relation with the measuring roller including a differential and a variable differential reversing means synchronized in timed relation with the measuring roller.

10. A multi-ply strip building machine comprising means for supplying bands of fabric thereto, means for continuously measuring the bands, and means coacting with the measuring means for cutting the bands into lengths including a gear train for actuating the cutting means intermittently at predetermined intervals.

11. A multi-ply strip building machine comprising means for supplying bands of fabric thereto, means for measuring the bands, intermittently operated means coacting with the measuring means for cutting the bands into predetermined lengths, and means for actuating the cutting means at predetermined intervals including a differential mechanism and an adjustable gear train for alternating the drive circuit through the differential.

12. A chafing strip building machine comprising means for supplying bands of fabric thereto, means for measuring the bands, intermittently operated means coacting with the measuring means for cutting the bands into predetermined lengths and means for actuating the cutting means at predetermined intervals including a differential, an adjustable gear train, and a brake mechanism operated by the gear train for reversing the drive circuit in the differential.

13. A multi-ply strip building machine comprising means for supplying bands of fabric thereto, means for measuring the bands, intermittently operating means coacting with the measuring means for cutting the bands into lengths, and means for actuating the cutting means at predetermined intervals including a differential, a shaft constituting a part of the differential, and an adjustable gear train mechanism actuated by the shaft of the differential, a brake mechanism secured to the shaft for reversing the drive circuit in the differential, and automatic means for releasing the brake.

14. A multi-ply strip building machine comprising means for supplying bands of material thereto, means for measuring the material into predetermined lengths, means for cutting the lengths, and means for operating the cutting means including a differential having two axles, one axle constituting a portion of the measuring means, a variable gear train driven by the other axle, a brake mechanism operated at variable intervals by the gear train for reversing the drive circuit in the differential, and a differential ring gear for driving the cutting means.

15. A multi-ply strip building machine comprising means for supplying a plurality of bands thereto, continuously operated means for measuring the bands into predetermined lengths, means for cutting the bands into lengths, and means for operating the cutting means intermittently, including a differential having two shafts, one shaft being synchronized with the measuring means, a variable gear train connected to the second shaft, a cam mechanism operated by the gear train, a brake actuated by the cam for interrupting the rotary motion of the second shaft and a differential ring gear for driving the cutting means.

16. A multi-ply strip building machine comprising means for supplying bands, means for measuring the bands into predetermined lengths, means for cutting the bands into such lengths, and a mechanism for operating the cutting means including a differential provided with a ring gear for driving the cutting means and two axle shafts, one axle shaft being synchronized with the measuring means, a variable gear train connected to the other axle, a cam actuated by the gear train, a brake mechanism operated by the cam for reversing the drive circuit through the differential, and a second cam mechanism for interrupting the movement of the cutting means.

17. A multi-ply strip building machine comprising means for supplying bands thereto, means for measuring the bands into predetermined lengths, means for cutting the bands into such lengths, and a mechanism for operating the cutting means including a differential provided with a ring gear for rotating the cutting means and two axle shafts, means for driving one of the axle shafts in synchronism with the measuring means, a gear train connected to the other axle shaft, a cam member actuated by the gear train, a brake mechanism operated by the cam to interrupt the movement of the second axle, thereby reversing the drive circuit in the differential whereby the ring gear is rotated, and a second cam member to limit the movement of the cutting means.

18. A machine for building multi-ply strips comprising means for supplying strip material continuously thereto, means for uniting the strips into a plurality of compound strips, means for partially severing the compound strips into predetermined lengths, means for superimposing the compound strips, and intermittently operated stitcher means for uniting the compound strips intermediate the lines of partial severance.

19. A chafing strip building machine comprising continuously operated rollers for measuring bands of fabric into predetermined lengths, intermittently operated band cutting rollers coacting with the measuring rollers to partially sever the bands of fabric transversely, the measuring and cutting rollers being so arranged as to superimpose the partially severed bands, stitcher means for uniting the cut bands in superimposed relation, and means for causing reciprocation of the stitcher means whereby portions only of the bands are stitched together.

20. A chafing strip building machine including means for supplying bands of fabric thereto, means for partially severing the bands into predetermined lengths, means for superimposing the partially severed bands, and stitcher means for engaging the superimposed bands intermittently.

21. A chafing strip building machine including means for supplying bands of fabric thereto, means for partially severing the bands into predetermined lengths, means for superimposing the bands, a stitching member for uniting the superimposed bands, and means for rendering the stitching member inoperative to stitch the partially severed portions of the bands.

22. A chafing strip building machine including means for supplying bands of fabric thereto, cutting means for partially severing the bands into lengths, intermittently operable mechanism for driving the cutting means, means for superimposing the partially severed bands, stitcher means for uniting the bands in superimposed relation, and means whereby the stitcher means is rendered inoperative periodically by the drive mechanism.

23. A chafing strip building machine including means for supplying bands of fabric thereto, intermittently operable means for partially severing the bands into strips of predetermined length, means for superimposing the bands, and stitcher means for uniting the superimposed bands, said stitcher means being yieldably maintained in engagement with the bands and periodically pivoted out of engagement with the bands by the intermittently operable severing means.

24. A chafing strip building machine including means for supplying bands of material thereto, means for aligning several bands comprising guides for the individual bands, each guide including resilient means for maintaining the bands in aligned relation, means for stitching certain of the bands together to form compound strips, means for measuring the compound strips, means for partially severing the compound strips into predetermined lengths, means for superimposing the compound strips, and means for stitching together portions only of the compound strips.

25. In a chafing strip building machine a strip guide comprising a plate having means for adjustably connecting it to the machine frame, end members secured to the plate, a pair of coacting rollers journalled in the end plates, a spring member, and means for adjustably positioning the spring member with respect to one of the end members.

26. In a chafing strip building machine a strip guide comprising a plate having means for adjustably connecting it to the machine frame, end members secured to the plate, a pair of coacting rollers journalled in the end plates, a strip engaging member, and means for adjustably positioning the strip engaging member with respect to one of the end members.

27. A chafing strip building machine comprising means for supplying bands of fabric material thereto, means for cutting the bands into strips of predetermined length, and a plurality of means for aligning the several bands, each comprising a supporting member, adjustable on the frame of the machine, a band guide mounted thereon, a spring secured to the guide for engaging one edge of the band, and an adjustable collar secured to the supporting member to define the position of adjustment of the latter.

28. A machine for building chafing strips including a plurality of layers of unvulcanized rubber and fabric comprising means for assembling a plurality of unitary fabric bands, means for aligning the bands, means for supplying a rubber tissue to the individual bands, means for uniting the rubber tissue with the fabric bands, variable means for partially severing the compound bands thus obtained into predetermined lengths, means for superimposing the compound bands, means for uniting the partially severed bands intermediate the points of partial severance, and means for operating all of said means in coacting relation.

29. A machine for building chafing strips comprising a trellis structure for assembling a plurality of rubberized fabric bands, a mechanism provided with a roll of liner having gum strips wound therein including means for re-winding the roll of liner bearing the gum strips, means for disengaging a plurality of strips from the liner during the rewinding operation, guides for aligning the strips with the individual bands, means for stitching the strips to the bands, cutting members for cutting the assembled strips and bands into predetermined lengths, a differential mechanism for actuating the cutting members periodically, means for superimposing the cut bands and stitcher members for uniting the cut bands in superimposed relation.

30. A chafing strip building machine comprising means for cutting bands of chafing strip building material into predetermined lengths, means for actuating the cutting means periodically, and means for supplying band material to the cutting means comprising a driven adjustable member of variable peripheral velocity for engaging the bands, and means for insuring frictional contact between the band and the adjustable member.

31. A chafing strip building machine comprising means for cutting bands of chafing strip material into predetermined lengths, means for actuating the cutting means periodically, and means for supplying the bands of material to the cutting means, each supplying means comprising a driven expansible roller adapted to engage the bands and an auxiliary roller engageable with the expansible roller to insure frictional contact between the bands and the driven roller.

32. A chafing strip building machine comprising means for cutting bands of chafing strip material into predetermined lengths, means for actuating the cutting means periodically, and means for supplying the band materials to the cutting means, each supply means comprising a driven expansible roller having a knurled surface to engage the bands, and an auxiliary roller having a knurled surface to engage the bands, and an auxiliary idler roller yieldably maintained thereagainst to insure a frictional contact between the band and the expansible roller.

In witness whereof I have hereunto signed my name.

RAPHAEL S. KIRK.